US007965850B2

(12) United States Patent
Higashihara

(10) Patent No.: US 7,965,850 B2
(45) Date of Patent: Jun. 21, 2011

(54) RESONANCE FREQUENCY DETERMINING METHOD, RESONANCE FREQUENCY SELECTING METHOD, AND RESONANCE FREQUENCY DETERMINING APPARATUS

(75) Inventor: Daisuke Higashihara, Hyogo (JP)

(73) Assignee: TOA Corporation, Kobe-shi (JP)

( * ) Notice: Subject to any disclaimer, the term of this patent is extended or adjusted under 35 U.S.C. 154(b) by 1156 days.

(21) Appl. No.: 11/568,300

(22) PCT Filed: Apr. 26, 2005

(86) PCT No.: PCT/JP2005/007868

§ 371 (c)(1),
(2), (4) Date: Feb. 21, 2007

(87) PCT Pub. No.: WO2005/104610

PCT Pub. Date: Nov. 3, 2005

(65) Prior Publication Data

US 2007/0180913 A1 Aug. 9, 2007

(30) Foreign Application Priority Data

Apr. 27, 2004 (JP) ................................ 2004-131629

(51) Int. Cl.
*H04R 29/00* (2006.01)
*G01H 13/00* (2006.01)

(52) U.S. Cl. ........................................... 381/59; 73/579

(58) Field of Classification Search .................... 381/56, 381/58, 59; 73/579, 596–600, 586, 602, 73/645, 646
See application file for complete search history.

(56) References Cited

U.S. PATENT DOCUMENTS 2,576,423 A 11/1951 Stewart
4,389,891 A * 6/1983 Fournier ........................ 73/579
5,619,344 A 4/1997 Yoshida et al.
6,396,192 B2 * 5/2002 Morales Serrano et al. ........................ 310/316.01

(Continued)

FOREIGN PATENT DOCUMENTS

JP 56066919 6/1981

(Continued)

OTHER PUBLICATIONS

Supplementary European Search Report for EP 05 73 7289, dated Mar. 20, 2008.

(Continued)

*Primary Examiner* — Curtis Kuntz
*Assistant Examiner* — Hai Phan
(74) *Attorney, Agent, or Firm* — Marshall, Gerstein & Borun LLP

(57) ABSTRACT

A resonant frequency characteristic in a resonant space is detected, based on a base amplitude frequency characteristic obtained by outputting a sound wave of a specified measurement signal from a speaker 13 disposed in a sound space 40 and by receiving the sound wave in a microphone 14 disposed in the sound space 40, a first amplitude frequency characteristic obtained by outputting, from the speaker 13, a sound wave of the measurement signal and a signal output from the microphone 14 and by receiving the sound wave in the microphone 14, and a second amplitude frequency characteristic obtained by outputting, from the speaker 13, a sound wave of the measurement signal and a phase inverted signal obtain by inverting a phase of the signal output from the microphone 14 and by receiving the sound wave in the microphone 14.

12 Claims, 19 Drawing Sheets

U.S. PATENT DOCUMENTS 7,249,511 B2 * 7/2007 Higashihara .................... 73/579

FOREIGN PATENT DOCUMENTS

| | | |
|---|---|---|
| JP | 60-232797 | 11/1985 |
| JP | 02041004 | 2/1990 |
| JP | 06-202671 | 7/1994 |
| JP | 06-265401 | 9/1994 |
| JP | 07-154467 | 6/1995 |
| JP | 08-294194 | 11/1996 |
| JP | 11127496 | 5/1999 |
| JP | 2000-115883 | 4/2000 |

OTHER PUBLICATIONS

International Search Report in International (JP) Application PCT/JP2005/007868, by the Japanese Patent Office, dated Jul. 25, 2005.

* cited by examiner

RESONANCE FREQUENCY DETERMINING METHOD, RESONANCE FREQUENCY SELECTING METHOD, AND RESONANCE FREQUENCY DETERMINING APPARATUS

TECHNICAL FIELD

The present invention relates to a method and apparatus for detecting a resonant frequency in a resonant space, and a method of selecting the resonant frequency to be set as a dip center frequency in a dip filter from detected resonant frequencies.

BACKGROUND ART

In some cases, it is necessary to detect a resonant frequency in a resonant space. For example, when acoustic equipment such as a speaker is installed in a hall or a gymnasium to emit a sound wave from a speaker, music or voice from the speaker is sometimes difficult to listen to because of the presence of the resonant frequency in this space (sound space in which the acoustic equipment is installed). To be specific, if the sound wave from the speaker contains a component of the resonant frequency in large amount, resonance occurs in a frequency of this component in the sound space. A resonant sound is like "won . . . " or "fan . . . " The resonant sound is not a sound wave to be emitted from the speaker and makes it difficult to listen to the music or the voice from the speaker.

To avoid this, the resonant frequency in the sound space is detected, and a dip filter or the like is disposed at a forward stage of the speaker in the acoustic equipment to attenuate the component of the resonant frequency. Thereby, resonance is unlikely to occur in this sound space, making it easy to listen to the music or the voice from the speaker. In order to determine a frequency characteristic of the dip filter, it is necessary to first detect the resonant frequency in the sound space.

Traditionally, an operator or a measuring person for the acoustic equipment has distinguished the sound wave from the speaker or the resonant sound depending on their senses of hearing to make judgment of the resonant frequency.

DISCLOSURE OF THE INVENTION

Problems to be Solved by the Invention

However, some skill or experience is required to distinguish the sound for judgment of the resonant frequency depending on the senses of hearing. Such detection of the resonant frequency depending on the skill or experience is not always accurate.

Even a skilled person has difficulty in distinguishing the resonant frequency from a feedback frequency by a sense of hearing. This is because the resonant frequency is determined by a feature of the resonant space and the feedback frequency is determined by a structure of a feedback loop including an electroacoustic system, but they sound similarly.

This has impeded automatic measurement and automatic adjustment of the acoustic equipment installed in the sound space or the like.

An object of the present invention is to provide a method and apparatus for detecting a resonant frequency which is capable of accurately detecting the resonant frequency without experience or skills. In particular, an object of the present invention is to provide a method and apparatus for detecting a resonant frequency which are able to detect the resonant frequency so as to be distinguished from the feedback frequency.

Another object of the present invention is to provide a method of selecting a resonant frequency that is capable of objectively selecting a resonant frequency to be set as a dip center frequency in a dip filter, from detected plurality of resonant frequencies.

Means for Solving the Problems

To solve the above mentioned problems, a method of detecting a resonant frequency of the present invention comprises a base step of measuring a base amplitude frequency characteristic; a first step of measuring a first amplitude frequency characteristic; and a second step of measuring a second amplitude frequency characteristic; wherein the base amplitude frequency characteristic is an amplitude frequency characteristic obtained by outputting a sound wave of a specified measurement signal from a speaker disposed in a resonant space and by receiving the sound wave in a microphone disposed in the resonant space; wherein the first amplitude frequency characteristic is an amplitude frequency characteristic obtained by outputting, from the speaker, a sound wave of the measurement signal and a first delayed signal obtained by delaying a signal output from the microphone by first delay time that is not less than zero, and by receiving the sound wave in the microphone; wherein the second amplitude frequency characteristic is an amplitude frequency characteristic obtained by outputting, from the speaker, a sound wave of the measurement signal and a second delayed signal obtained by delaying the signal output from the microphone by second delay time that is not less than zero, and by receiving the sound wave in the microphone; and wherein the second delay time is different from the first delay time; and detecting the resonant frequency in the resonant space based on the base amplitude frequency characteristic, the first amplitude frequency characteristic, and the second amplitude frequency characteristic. The measurement signal may be delayed together with the signal output from the microphone and the sound wave thereof may be output from the speaker, or the sound wave of the measurement signal may be output from the speaker without delaying it.

To solve the above mentioned problem, an apparatus for detecting a resonant frequency of the present invention comprises a sound source means; a signal switch means; and a measuring means; wherein the sound source means is configured to generate a measurement signal; wherein the signal switch means is capable of receiving, as inputs the measurement signal from the sound source means and a signal output from a microphone; wherein the signal switch means is capable of switching its state among a base state in which the measurement signal is output to a speaker so as to cause the speaker to output a sound wave, a first state in which the measurement signal and a first delayed signal obtained by delaying the signal output from the microphone by first delay time that is not less than zero are output to the speaker so as to cause the speaker to output a sound wave, and a second state in which the measurement signal and a second delayed signal obtained by delaying the signal output from the microphone by second delay time that is not less than zero are output to the speaker so as to cause the speaker to output a sound wave; wherein the second delay time is different from the first delay time; wherein the measuring means is capable of measuring an amplitude frequency characteristic from the signal output from the microphone; and wherein the measuring means detects the resonant frequency based on comparison between a base amplitude frequency characteristic obtained by measurement with the state of the signal switch means set to the base state and a first amplitude frequency characteristic obtained by measurement with the state of the signal switch means set to the first state, and comparison between the base amplitude frequency characteristic and a second amplitude frequency characteristic obtained by measurement with the state of the signal switch means set to the second state. The measurement signal may be delayed together with the signal output from the microphone and the sound wave thereof may be output from the speaker, or the sound wave of the measurement signal may be output from the speaker without delaying it.

In the above method and apparatus, the first delay time or the second delay time may be zero.

To solve the above mentioned problems, another method of detecting a resonant frequency of the present invention comprises a base step of measuring a base amplitude frequency characteristic; a first step of measuring a first amplitude frequency characteristic; and a second step of measuring a second amplitude frequency characteristic; wherein the base amplitude frequency characteristic is an amplitude frequency characteristic obtained by outputting a sound wave of a specified measurement signal from a speaker disposed in a resonant space and by receiving the sound wave in a microphone disposed in the resonant space; wherein the first amplitude frequency characteristic is an amplitude frequency characteristic obtained by outputting, from the speaker, a sound wave of the measurement signal and a signal output from the microphone and by receiving the sound wave in the microphone; and wherein the second amplitude frequency characteristic is an amplitude frequency characteristic obtained by outputting, from the speaker, a sound wave of the measurement signal and a phase-inverted signal obtained by inverting a phase of the signal output from the microphone and by receiving the sound wave in the microphone; and detecting the resonant frequency in the resonant space based on the base amplitude frequency characteristic, the first amplitude frequency characteristic, and the second amplitude frequency characteristic. The measurement signal may be phase-inverted together with the signal output from the microphone and the sound wave thereof may be output from the speaker, or the sound wave of the measurement signal may be output from the speaker without inverting its phase.

To solve the above mentioned problem, another apparatus for detecting a resonant frequency comprises: a sound source means; a signal switch means; and a measuring means; wherein the sound source means is configured to generate a measurement signal; wherein the signal switch means is capable of receiving, as inputs, the measurement signal from the sound source means and a signal output from a microphone; wherein the signal switch means is capable of switching its state among a base state in which the measurement signal is output to a speaker so as to cause the speaker to output a sound wave, a first state in which the measurement signal and the signal output from the microphone are output to the speaker so as to cause the speaker to output a sound wave, and a second state in which the measurement signal and a phase-inverted signal obtained by inverting a phase of the signal output from the microphone are output to the speaker so as to cause the speaker to output a sound wave; wherein the measuring means is capable of measuring an amplitude frequency characteristic from the signal output from the microphone; and wherein the measuring means detects the resonant frequency based on comparison between a base amplitude frequency characteristic obtained by measurement with the state of the signal switch means set to the base state and a first amplitude frequency characteristic obtained by measurement with the state of the signal switch means set to the first state, and comparison between the base amplitude frequency characteristic and a second amplitude frequency characteristic obtained by measurement with the state of the signal switch means set to the second state. The measurement signal may be phase-inverted together with the signal output from the microphone and the sound wave thereof may be output from the speaker, or the sound wave of the measurement signal may be output from the speaker without inverting its phase.

In the above method and apparatus, as a first frequency group, a frequency having a peak at which an amplitude of the first amplitude frequency characteristic is larger than an amplitude of the base amplitude frequency characteristic, is detected from a difference between the base amplitude frequency characteristic and the first amplitude frequency characteristic, as a second frequency group, a frequency having a peak at which an amplitude of the second amplitude frequency characteristic is larger than an amplitude of the base amplitude frequency characteristic, is detected from a difference between the base amplitude frequency characteristic and the second amplitude frequency characteristic; and as the resonant frequency, a frequency included in the first frequency group and the second frequency group is detected.

To solve the above mentioned problem, another method of selecting a resonant frequency of the present invention comprises detecting a plurality of resonant frequencies by the above mentioned method of detecting the resonant frequency; and selecting, from the detected plurality of frequencies, dip center frequencies to be set in a dip filter in decreasing order of magnitude of an amplitude level of the first amplitude frequency characteristic or the second amplitude frequency characteristic. In this case, from the selected plurality of resonant frequencies, dip center frequencies to be set in a dip filter may be selected preferentially in decreasing order of magnitude of an amplitude level of an amplitude frequency characteristic obtained by subtracting the base amplitude frequency characteristic from the first amplitude frequency characteristic or the second amplitude frequency characteristic.

To solve the above mentioned problem, another method of detecting a resonant frequency of the present invention comprise an attenuation property measuring step of measuring attenuation property of a signal output from a microphone, the microphone being disposed in a resonant space and being configured to receive, from a speaker disposed in the resonant space, a sound wave of a reference frequency signal continued for predetermined time; and detecting the resonant frequency in the resonant space based on the attenuation property; wherein the reference frequency signal is a sine wave signal with a specific frequency or a signal having a component within a predetermined frequency bandwidth including the specific frequency at a center thereof.

To solve the above mentioned problems, another apparatus for detecting a resonant frequency comprises a sound source means; and a measuring means; wherein the sound source means is capable of generating and outputting a measurement signal; wherein the measurement signal is a reference frequency signal continued for a predetermined time; wherein the reference frequency signal is a sine wave signal with a specific frequency or a signal having a component within a predetermined frequency bandwidth including the specific frequency at a center thereof', wherein the measuring means is capable of receiving as an input the signal output from the microphone; and wherein the measuring means measures an attenuation property of the signal output from the microphone and detects the resonant frequency based on the attenuation property.

To solve the above mentioned problem, another method of detecting a resonant frequency of the present invention comprises an attenuation property measuring step of measuring attenuation property of a signal output from a microphone, the microphone being disposed in a resonant space and being configured to receive, from a speaker disposed in the resonant space, a sound wave of a reference frequency signal continued for predetermined time and the signal output from the microphone; and detecting the resonant frequency in the resonant space based on the attenuation property; wherein the reference frequency signal is a sine wave signal with a specific frequency or a signal having a component within a predetermined frequency bandwidth including the specific frequency at a center thereof.

To solve the above mentioned problem, an apparatus for detecting a resonant frequency of the present invention comprises a sound source means; a signal output means; and a measuring means; wherein the sound source means is configured to generate a measurement signal; wherein the measurement signal is a reference frequency signal continued for a predetermined time; wherein the reference frequency signal is a sine wave signal with a specific frequency or a signal having a component within a predetermined frequency bandwidth including the specific frequency at a center thereof, wherein the signal output means is capable of receiving as inputs the measurement signal from the sound source means and the signal output from the microphone; wherein the signal output means is capable of outputting, to a speaker, the measurement signal and the signal output from the microphone so as to cause the speaker to output a sound wave; wherein the measuring means is capable of receiving as an input the signal output from the microphone; wherein the measuring means measures an attenuation property of the signal output from the microphone and detects the resonant frequency based on the attenuation property.

In the above method and apparatus, it may be determined that the specific frequency of the reference frequency signal is the resonant frequency when an attenuation rate obtained from the attenuation property is lower than the predetermined attenuation rate.

To solve the above mentioned problem, another method of detecting a resonant frequency of the present invention comprises an attenuation property measuring step of measuring attenuation property of a signal output from a microphone, the microphone being disposed in a resonant space and being configured to receive, from a speaker disposed in the resonant space, a sound wave of a reference frequency signal repeated plural times intermittently and a delayed signal obtained by delaying the signal output from the microphone by delay time that is not less than zero; and detecting the resonant frequency in the resonant space based on the attenuation property; wherein the delay time changes to be synchronous with intermittent repeating of the reference frequency signal; and wherein the reference frequency signal is a sine wave signal with a specific frequency or a signal having a component within a predetermined frequency bandwidth including the specific frequency at a center thereof. The reference frequency signal may be delayed together with the signal output from the microphone and the sound wave thereof may be output from the speaker, or the sound wave of the reference frequency signal may be output from the speaker without delaying it.

To solve the above mentioned problem, another apparatus for detecting a resonant frequency of the present invention comprises a sound source means; a signal output means; and a measuring means; wherein the sound source means is configured to generate a measurement signal; wherein the measurement signal is a reference frequency signal repeated plural times intermittently; wherein the reference frequency signal is a sine wave signal with a specific frequency or a signal having a component within a predetermined frequency bandwidth including the specific frequency at a center thereof, wherein the signal output means is capable of receiving as inputs the measurement signal from the sound source means and the signal output from the microphone; wherein the signal output means is capable of outputting, to a speaker, the measurement signal and a delayed signal obtained by delaying the signal output from the microphone by delay time that is not less than zero so as to cause the speaker to output a sound wave; wherein signal output means changes the delay time to be synchronous with intermittent repeating of the reference frequency signal; wherein the measuring means is capable of receiving as an input the signal output from the microphone; and wherein the measuring means measures an attenuation property of the signal output from the microphone and detects the resonant frequency based on the attenuation property. The reference frequency signal may be delayed together with the signal output from the microphone and the sound wave thereof may be output from the speaker, or the sound wave of the reference frequency signal may be output from the speaker without delaying it.

In the above method and apparatus, it may be determined whether or not the attenuation property changes according to change in the delay time; and it may be determined that the specific frequency of the reference frequency signal is not the resonant frequency, when it is determined that the attenuation property changes according to the change in the delay time.

To solve the above mentioned problem, another method of detecting a resonant frequency of the present invention comprises an attenuation property measuring step of selecting a first sound wave state in which a speaker disposed in a resonant space outputs a sound wave of a reference frequency signal repeated plural times intermittently and a signal output from a microphone disposed in the resonant space, or a second sound wave state in which the speaker outputs a sound wave of the reference frequency signal repeated plural times intermittently and a phase-inverted signal obtained by inverting a phase of the signal output from the microphone, receiving the sound wave in the microphone, and measuring an attenuation property of the signal output from the microphone; and detecting the resonant frequency in the resonant space based on the attenuation property; wherein a sound wave state is changed from the first sound wave state to the second sound wave state or from the second sound wave state to the first sound wave state to be synchronous with intermittent repeating of the reference frequency signal; and wherein the reference frequency signal is a sine wave signal with a specific frequency or a signal having a component within a predetermined frequency bandwidth including the specific frequency at a center thereof. The reference frequency signal may be phase-inverted together with the signal output from the microphone and the sound wave thereof may be output from the speaker, or the sound wave may be output from the speaker without inverting its phase.

To solve the above mentioned problem, another apparatus for detecting a resonant frequency comprises a sound source means; a signal output means; and a measuring means; wherein the sound source means is configured to generate a measurement signal; wherein the measurement signal is a reference frequency signal repeated plural times intermittently; wherein the reference frequency signal is a sine wave signal with a specific frequency or a signal having a component within a predetermined frequency bandwidth including the specific frequency at a center thereof, wherein the signal output means is capable of receiving as inputs the measurement signal from the sound source means and the signal output from the microphone; wherein the signal output means is selectively setting its state to a first output state in which the signal output means outputs, to a speaker, the measurement signal and the signal output from the microphone so as to cause the speaker to output a sound wave, or to a second output state in which the signal output means outputs, to the speaker, the measurement signal and a phase-inverted signal obtained by inverting a phase of the signal output from the microphone so as to cause the speaker to output a sound wave; wherein the signal output means changes its state from the first output state to the second output state or from the second output state to the first output state so as to be synchronous with intermittent repeating of the reference frequency signal; wherein the measuring means is capable of receiving as an input the signal output from the microphone; and wherein the measuring means measures attenuation property of the signal output from the microphone and detects the resonant frequency based on the attenuation property. The reference frequency signal may be phase-inverted together with the signal output from the microphone and the sound wave thereof may be output from the speaker, or the sound wave may be output from the speaker without inverting its phase.

In the above method, it may be determined whether or not the attenuation property changes according to change in the sound wave state; and it may be determined that the specific frequency of the reference frequency signal is not the resonant frequency, when it is determined that the attenuation property changes according to the change in the sound wave state. In the above apparatus, the measuring means may determine whether or not the attenuation property changes according to change in the state of the signal output means, and may determine that the specific frequency of the reference frequency signal is not the resonant frequency when determining that the attenuation property changes according to the change in the state of the signal output means.

In the method and apparatus for detecting the resonant frequency based on the amplitude frequency characteristic, the measurement signal may be any signals suitably used for measurement of the amplitude frequency characteristic, for example, sine wave sweep signal, a noise signal having a component within a predetermined frequency bandwidth and having a center frequency that sweeps, or a pink noise.

In the method and apparatus for detecting the resonant frequency based on the attenuation property, measurement of the attenuation property may be repeated plural times while changing the specific frequency of the reference frequency signal.

Effects of the Invention

In accordance with the present invention, the resonant frequency can be detected accurately without a need for an experience or skills, and the frequencies to be set as the dip center frequencies in the dip filter can be selected appropriately.

BEST MODE FOR CARRYING OUT THE INVENTION

Embodiments of the present invention will be described with reference to the drawings.

Figure 1:
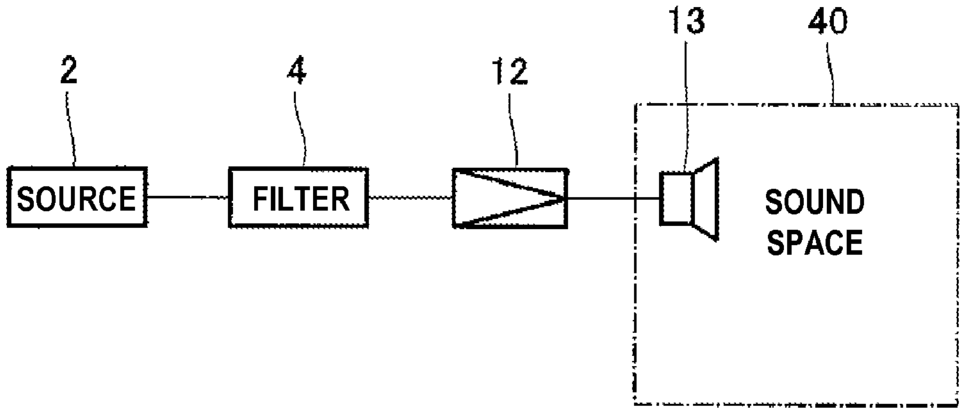
FIG. 1 is a schematic view of a construction of an acoustic system installed in a sound space (e.g., concert hall or gymnasium)

FIG. 1 is a schematic view of a construction of an acoustic system installed in a sound space (e.g., resonant space such as concert hall or gymnasium where resonance occurs) 40. The acoustic system comprises a sound source device 2, a dip filter 4, an amplifier 12, and a speaker 13. The sound source device 2 may be a music instrument such as a CD player for playback of, for example, music CD, or a microphone. Whereas the sound source device 2 is illustrated as being located outside the sound space 40 in FIG. 1, it may alternatively be installed within the sound space 40. The sound source device 2 may be, for example, a microphone installed within the sound space 40. The dip filter 4 serves to remove a signal component in a specified frequency from a signal output from the sound source device 2 and to output the resulting signal to the amplifier 12. The amplifier 12 amplifies the signal output from the dip filter 4 and outputs the amplified signal to the speaker 13, which outputs a sound wave in the sound space 40.

When the sound space 40 has a resonant frequency and the sound wave output from the speaker 13 contains a component of the resonant frequency in large amount, resonance occurs in the sound space 40 and thereby music or voice output from the speaker 13 is difficult to listen to. If an appropriate frequency characteristic is set in the dip filter 4 in this acoustic system, then the resonance in the sound space 40 is prevented without degrading a sound quality of the sound wave from the speaker 13.

In this embodiment, resonant frequencies in the round space 40 are detected, and a frequency to be set as a dip center frequency in the dip filter 4 is selected from the detected resonant frequencies. First of all, a method and apparatus for detecting the resonant frequency in the round space 40 will be described with reference to FIGS. 2 to 26.

Figure 2:
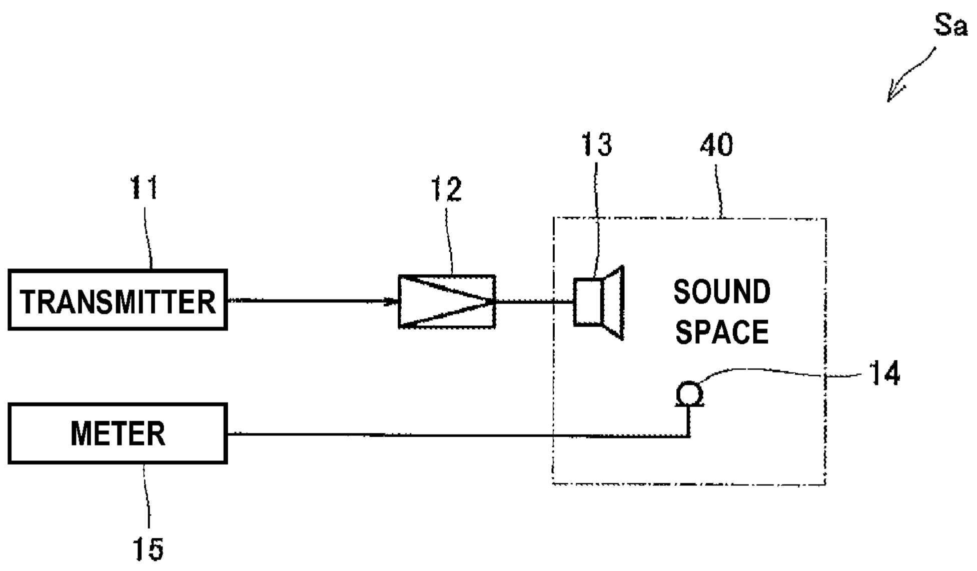
FIG. 2 is a schematic block diagram of a system for measuring an amplitude frequency characteristic in the sound space (e.g., concert hall or gymnasium)

FIG. 2 is a schematic block diagram of a system Sa for measuring an amplitude frequency characteristic in the sound space (e.g., concert hall or gymnasium) 40. The system Sa comprises a transmitter 11 which is a sound source means configured to output a measurement signal, an amplifier 12 configured to receive, as an input, the signal output from the transmitter 11 and to power-amplify the signal, a speaker 13 configured to receive, as an input, the signal output from the amplifier 12 and to output a sound wave, a microphone 14 configured to receive the sound wave emitted from the speaker 13, and a meter 15 configured to receive, as an input, the sound wave from the microphone 14. The microphone 14 may be a noise level meter.

The speaker 13 and the microphone 14 are placed within the sound space 40. The microphone 14 is positioned so as to receive a reflected sound of the sound wave directly output from the speaker 13 at a sufficiently high level within the sound space 40.

The transmitter 11 outputs, as the measurement signal, a sine wave signal whose frequency varies with time, i.e., a sine wave sweep signal. The sine wave sweep signal has a constant sine wave level at respective time points during frequency sweep.

The meter 15 has a band pass filter whose center frequency varies with time. The band pass filter varies the center frequency with time according to time variation of the frequency of the sine wave sweep signal output from the transmitter 11. Therefore, the meter 15 detects the level of the signal that has been output from the microphone 14 and has passed through the band pass filter, thus measuring an amplitude characteristic of the frequency at that point of time.

Figure 3:
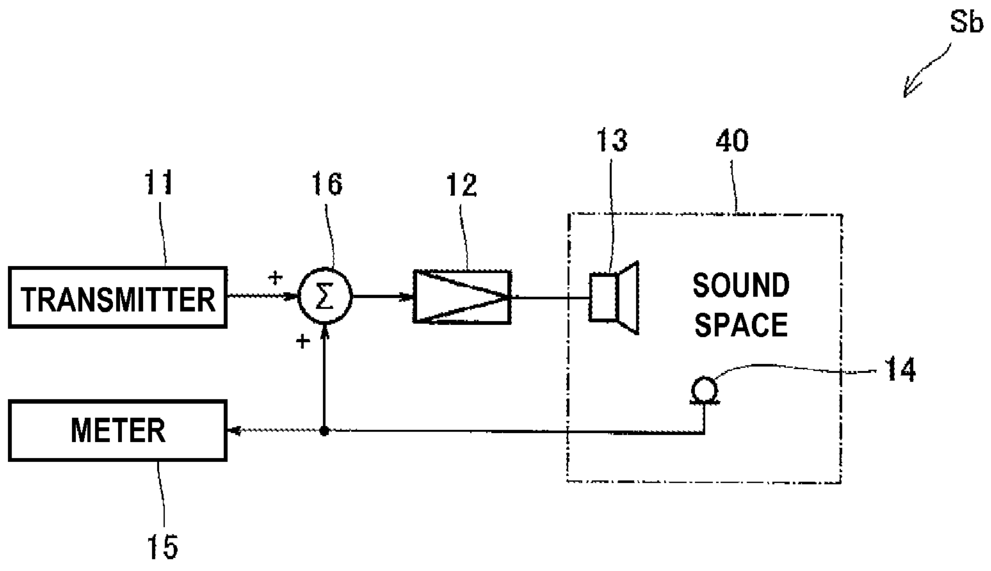
FIG. 3 is a schematic block diagram of a system for measuring an amplitude frequency characteristic in the sound space.

FIG. 3 is a schematic block diagram of a system Sb for measuring an amplitude frequency characteristic in the sound space 40. The system Sb is constructed such that a signal synthesization path is added to the system Sa of FIG. 2. To be specific, the system Sb of FIG. 3 comprises the transmitter 11 which is the sound source means configured to output the measurement signal, a mixer 16, the amplifier 12 configured to receive, as an input, the signal output from the mixer 16 and to power-amplify the signal, the speaker 13 configured to receive, as an input, the signal output from the amplifier 12 and to output a sound wave, the microphone 14 configured to receive the sound wave emitted from the speaker 13, and the meter 15 configured to receive, as an input, the sound wave output from the microphone 14.

The speaker 13 and the microphone 14 are placed at the same positions within the sound space 40 as those in the system Sa of FIG. 2. The transmitter 11, the amplifier 12, the speaker 13, the microphone 14, and the meter 15 in the system Sb of FIG. 3 are identical to those in the system Sa of FIG. 2.

The distinction between the system Sb of FIG. 3 and the system Sa of FIG. 2 is that the amplifier 12 receives, as the input, the signal output from the transmitter 11 in the system Sa of FIG. 2, whereas the amplifier 12 receives, as the input, the signal output from the mixer 16 in the system Sb of FIG. 3. The mixer 16 of FIG. 3 receives, as inputs, the measurement signal (sine wave sweep signal) output from the transmitter 11 and the signal output from the microphone 14, synthesizes (mix) these signals, and outputs a synthesized signal (mixed signal).

Figure 4:
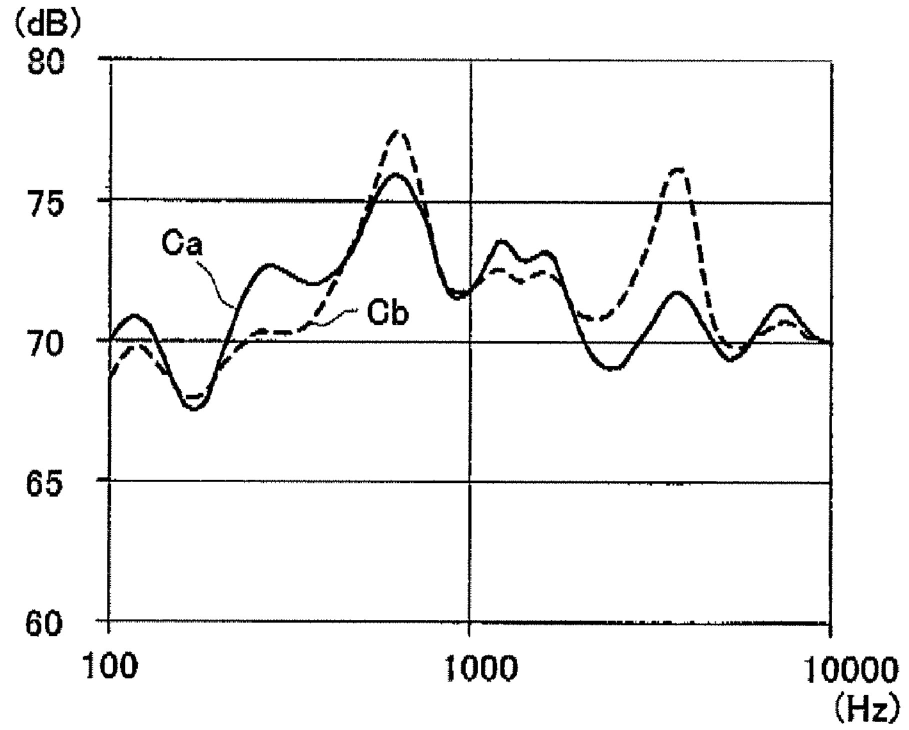
FIG. 4 is a view schematically showing an amplitude frequency characteristic of the sound space which is measured by the system of FIG. 2 and an amplitude frequency characteristic of the sound space which is measured by the system of FIG. 3.

FIG. 4 is a view schematically showing an amplitude frequency characteristic of the sound space 40 which is measured by the system Sa of FIG. 2 and an amplitude frequency characteristic of the sound space 40 which is measured by the system Sb of FIG. 3. In FIG. 4, a curve Ca indicated by a solid line is the amplitude frequency characteristic measured by the system Sa of FIG. 2 and a curve Cb indicated by a broken line is the amplitude frequency characteristic measured by the system Sb of FIG. 3.

Both the system Sa of FIG. 2 and the system Sb of FIG. 3 measure amplitude values at a number of frequency points. For example, in a range of frequencies to be measured, the systems Sa and Sb measure the amplitude values at intervals of 1/192 octave. The measurement values at a number of points (a number of frequency points) may be indicated by the curves Ca and Cb as the amplitude frequency characteristics of the sound space 40 without being smoothed on a frequency axis, or otherwise may be indicated by the curves Ca and Cb after they are smoothed in some method or another. The measurement values may be smoothed on the frequency axis in various methods, including moving average, for example. For example, moving average of 9 points may be performed with respect to the measurement values at a number of frequency points on the frequency axis. When the smoothed measurement values are used as the curve Ca, the smoothed measurement values are desirably used as the curve Cb. In this case, the curve Cb is desirably obtained by the same smoothing method as the curve Ca. If the curve Ca is obtained by performing moving average of 9 points on the frequency axis, then the curve Cb is desirably obtained by performing moving average of 9 points on the frequency axis.

The amplitude frequency characteristic indicated by the solid line curve Ca of FIG. 4 contains the resonant characteristic of the sound space 40 as well as the characteristic of the electroacoustic system including the amplifier 12, the speaker 13, and the microphone 14. The amplitude frequency characteristic indicated by the broken line curve Cb of FIG. 4 also includes the resonant characteristic of the sound space 40 as well as the characteristic of the electroacoustic system including the amplifier 12, the speaker 13, and the microphone 14. The amplitude frequency characteristic indicated by the broken line curve Cb shows a noticeable effect of the resonant characteristic of the sound space 40 by a feedback loop in which the signal output from the microphone 14 is input to the amplifier 12 and is output from the speaker 13, in contrast to the amplitude frequency characteristic of the solid line curve Ca. Furthermore, the amplitude frequency characteristic of the broken line Cb of FIG. 4 contains the characteristic associated with the feedback loop in which the signal output from the microphone 14 is input to the amplifier 12 and output from the speaker 13. Therefore, based on the difference between the curves (solid line curve Ca and broken line curve Cb), the resonant characteristic of the sound space 40 is known.

Figure 5:
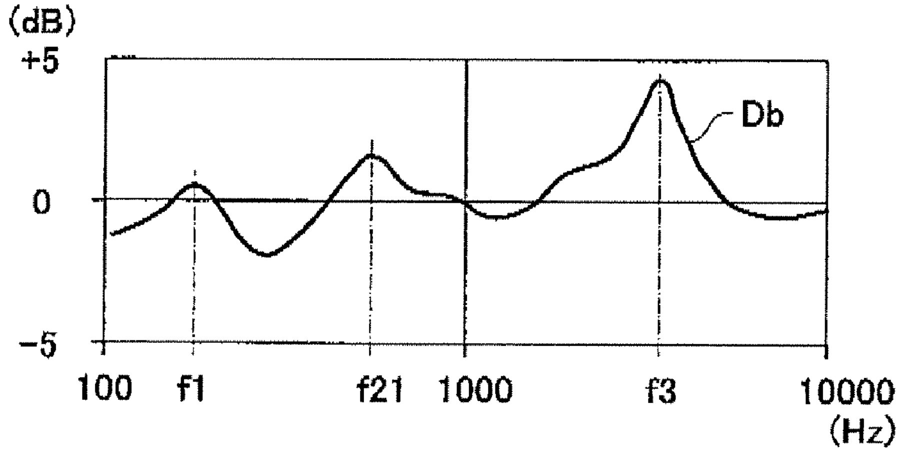
FIG. 5 is a view showing a frequency characteristic obtained by subtracting a solid line curve Ca from a broken line curve Cb in FIG. 4.

The frequency characteristic of FIG. 5 is obtained by subtracting the characteristic of the solid line curve Ca from the characteristic of the broken line curve Cb of FIG. 4. In a characteristic curve Db of FIG. 5, frequencies having positive peaks are frequency f1, frequency f21, and frequency f3. It is probable that the frequencies having the positive peaks are the resonant frequencies or the feedback frequencies. The number of resonant frequencies in the sound space 40 is not limited to one, but may be in many cases more. There is a possibility that among the frequencies f1, f21, and f3, one or more frequencies are resonant frequencies and one or more frequencies are feedback frequencies.

As used herein, the feedback frequency is a feedback frequency in the system Sb of FIG. 3. The feedback loop is composed of an electric path from the microphone 14 to the speaker 13, and an acoustic system path from the speaker 13 to the microphone 14. The microphone 14 is a measurement microphone for measuring an acoustic characteristic of the sound space 40. Therefore, for example, it is not necessary to set the feedback frequency as the dip frequency in a dip filter in the electroacoustic system installed in the sound space 40. Therefore, it is desirable to know which frequencies are the resonant frequencies among the frequency f1, the frequency f21, and the frequency f3. That is, the resonant frequency can be desirably detected so as to be distinguished from the feedback frequency. To effectively achieve this, the system Sc of FIGS. 6(*a*) and 6(*b*) perform the measurement.

Figure 6A:
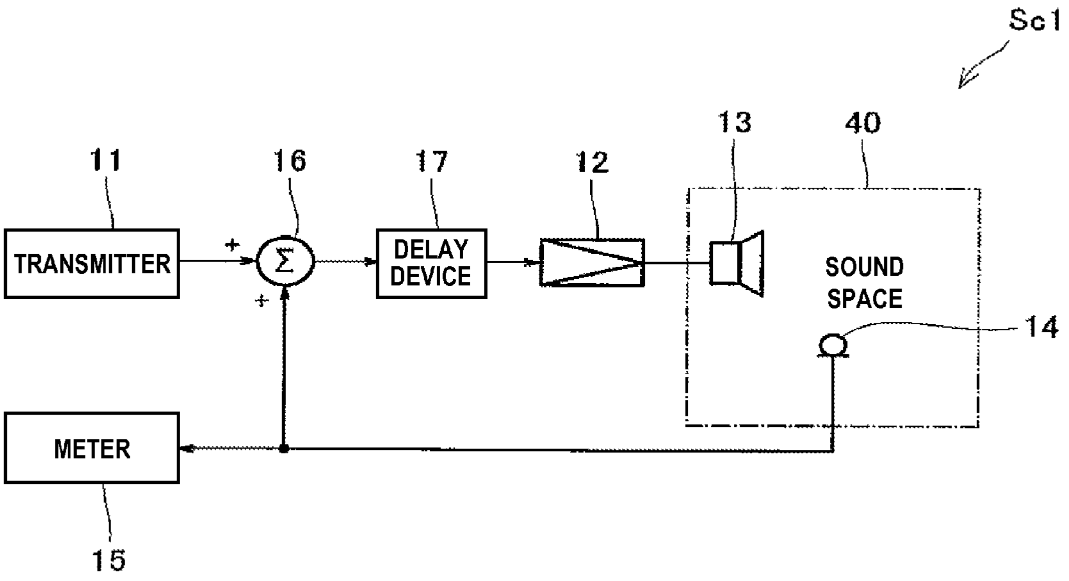
FIGS. 6(*a*) and 6(*b*) are schematic block diagrams of the system for measuring the amplitude frequency characteristic in the sound space.
Figure 6B:
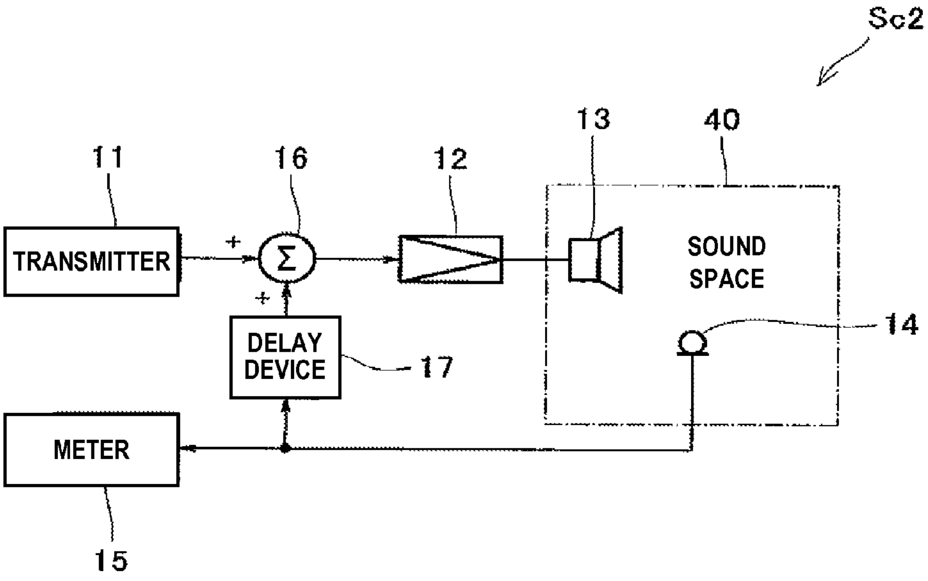

FIG. 6 is a schematic block diagram of systems Sc1 and Sc2 for measuring the amplitude frequency characteristic in the sound space 40. FIG. 6(*a*) shows the system Sc1 and FIG. 6(*b*) shows the system Sc2. The systems Sc1 and Sc2 are constructed such that a delay device 17 is added to the system Sb of FIG. 3.

Each of the systems Sc1 and Sc2 of FIGS. 6(*a*) and 6(*b*) comprise the transmitter 11 which is a sound source means configured to output a measurement signal, the mixer 16, the amplifier 12 configured to power-amplify the signal, the speaker 13 configured to receive, as an input, the signal output from the amplifier 12 and to output a sound wave, the microphone 14 configured to receive the sound wave emitted from the speaker 13, the meter 15 configured to receive, as an input, the sound wave from the microphone 14, and the delay device 17.

The speaker 13 and the microphone 14 are placed at the same positions within the sound space 40 as those in the system Sa of FIG. 2. The transmitter 11, the amplifier 12, the speaker 13, the microphone 14, and the meter 15 in the systems Sc1 and Sc2 of FIGS. 6(*a*) and 6(*b*) are identical to those in the system Sa of FIG. 2. In these respects, the systems Sc1 and Sc2 of FIGS. 6(*a*) and 6(*b*) are identical to those of the system Sb of FIG. 3.

The distinction between the systems Sc1 and Sc2 of FIGS. 6(*a*) and 6(*b*) and the system Sb of FIG. 3 is as follows. In the system Sb of FIG. 3, the mixer 16 receives as inputs the measurement signal (sine wave sweep signal) from the transmitter 11 and the signal output from the microphone 14, synthesizes (mixes) these input signals and outputs the synthesized signal to the amplifier 12.

In contrast, in the system Sc1 of FIG. 6(*a*), the delay device 17 delays the synthesized signal of the measurement signal (sine wave sweep signal) from the transmitter 11 and the signal output from the microphone 14, and outputs the delayed signal to the amplifier 12.

In the system Sc2 of FIG. 6(*b*), the mixer 16 receives as inputs the measurement signal (sine wave sweep signal) from the transmitter 11 and the delayed signal obtained by delaying the signal output from the microphone 14 in the delay device 17, mixes (synthesizes) these input signals, and outputs the synthesized signal to the amplifier 12.

In the systems (systems Sc1 and Sc2), the speaker 13 outputs the sound wave of the measurement signal and the delayed signal obtained by delaying the output signal from the microphone 14 in the delay device 17.

Figure 7:
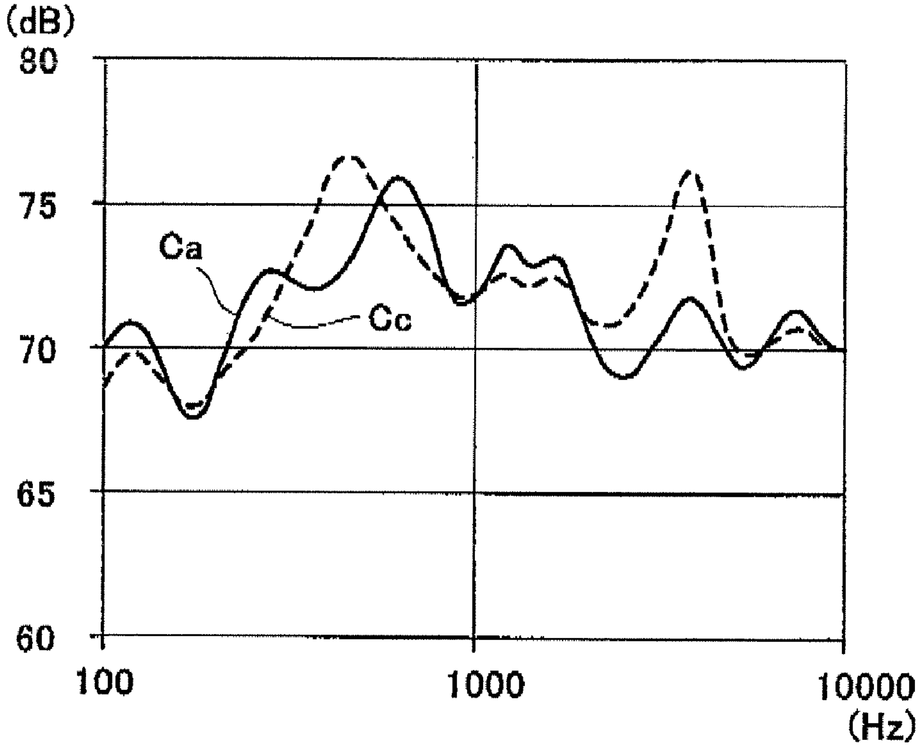
FIG. 7 is a view schematically showing the amplitude frequency characteristic of the sound space measured by the system of FIG. 2 and the amplitude frequency characteristic of the sound space measured by the system of FIGS. 6(*a*) and 6(*b*)

FIG. 7 is a view schematically showing the amplitude frequency characteristic of the sound space 40 measured by the system Sa of FIG. 2 and the amplitude frequency characteristic of the sound space 40 measured by the system Sc1 or Sc2 of FIGS. 6(*a*) and 6(*b*). To be precise, the amplitude frequency characteristic measured by the system Sc1 of FIG. 6(*a*) and the amplitude frequency characteristic measured by the system Sc2 of FIG. 6(*b*) are not the same, but will be explained as the same here.

In FIG. 7, the solid curve line curve Ca indicates the amplitude frequency characteristic measured by the system Sa of FIG. 2, and the broken curve line curve Cc indicates the amplitude frequency characteristic measured by the systems Sc1 and Sc2 of FIGS. 6(*a*) and 6(*b*).

As in the system Sa of FIG. 2 or the system Sb of FIG. 3, the systems Sc1 and Sc2 of FIGS. 6(*a*) and 6(*b*) measure amplitude values at a number of frequency points. For example, in a range of frequencies to be measured, the systems Sc1 and Sc2 measure the amplitude values at intervals of 1/192 octave. The measurement values at a number of points (a number of frequency points) may be indicated by the curves Ca and Cc as the amplitude frequency characteristics of the sound space 40 without being smoothed on a frequency axis, or otherwise may be indicated by the curves Ca and Cb after they are smoothed in some method or another. The measurement values may be smoothed on the frequency axis in various methods, including moving average, for example. For example, the moving average of 9 points may be performed for the measurement values at a number of frequency points on the frequency axis. When the smoothed measurement values are used as the curve Ca, the smoothed measurement values are desirably used as the curve Cc. In this case, the curve Cc is desirably obtained by the same smoothing method as the curve Ca.

As described above, the amplitude frequency characteristic of the solid line curve Ca contains the resonant characteristic of the sound space 40 as well as the characteristic of the electroacoustic system including the amplifier 12, the speaker 13, and the microphone 14.

The systems Sc1 and Sc2 of FIGS. 6(*a*) and 6(*b*) include a feedback loop in which the signal output from the microphone 14 is delayed and the delayed signal is input to the amplifier 12 and output from the speaker 13. The amplitude frequency characteristic of the broken line curve Cc of FIG. 7 shows not only the characteristic of the electroacoustic system including the amplifier 12, the speaker 13, and the microphone 14, but the resonant characteristic of the sound space 40 that is more noticeable than that of the amplitude frequency characteristic of the solid line curve Ca. Further, the amplitude frequency characteristic of the broken line curve Cc of FIG. 7 includes the characteristic associated with the feedback by the feedback loop in which the signal output from the microphone 14 is delayed and the delayed signal is input to the amplifier 12 and output from the speaker 13.

Thus, the broken line curve Cc of FIG. 7 is identical to the broken line curve Cb of FIG. 4 in that the resonant characteristic of the sound space 40 is shown noticeably and the characteristic associated with the feed back is shown. But, the structure of the feedback loop of the systems Sc1 and Sc2 of FIGS. 6(*a*) and 6(*b*) is not identical to the structure of the feedback loop of the system Sb of FIG. 3 in that the systems Sc1 and Sc2 of FIGS. 6(*a*) and 6(*b*) have the delay device 17. Therefore, the characteristic associated with the feedback shown in the broken line curve Cc of FIG. 7 is different from the characteristic associated with the feedback shown in the broken line curve Cb of FIG. 4.

Figure 8:
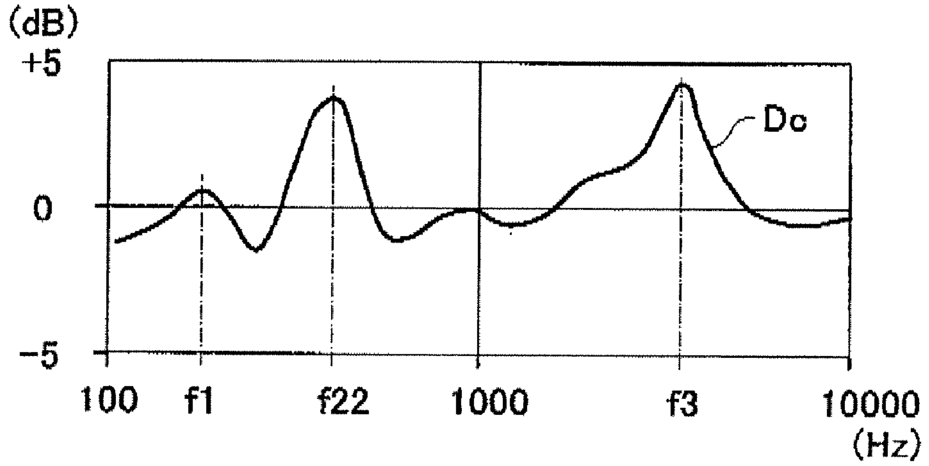
FIG. 8 is a view showing a frequency characteristic obtained by subtracting a solid line curve Ca from a broken line curve Cb in FIG. 7.

A frequency characteristic of FIG. 8 is obtained by subtracting the solid line curve Ca from the broken line curve Cb in FIG. 7. In FIG. 8, frequencies having positive peaks are frequency f1, frequency f22, and frequency f3. It is probable that the frequencies having positive peaks are the resonant frequencies or the feedback frequencies.

Now, the characteristic of FIG. 5 will be compared to the characteristic of FIG. 8. The frequency characteristic of FIG. 5 shows positive peaks at the frequency f1, the frequency f21, and the frequency f3. The frequency characteristic of FIG. 8 shows positive peaks at the frequency f1, the frequency f22, and the frequency f3. The frequencies f1 and the frequency f3 have positive peaks in the frequency characteristics of these Figures. The frequency f21 has the positive peak only in the frequency characteristic of FIG. 5. The frequency f22 has the positive peak only in the frequency characteristic of FIG. 8.

As described above, the characteristic associated with the feedback shown in the broken like Cc of FIG. 7 is different from the characteristic associated with the feedback shown in the broken line curve Cb of FIG. 4. Therefore, it may be considered that the frequency showing the positive peak because of the feedback in the frequency characteristic of FIG. 5 is different from the frequency showing the positive peak because of the feedback in the frequency characteristic of FIG. 8.

In contrast, it may be considered that the frequency having the positive peak because of the resonance in the round space 40 is shown in the frequency characteristic of FIG. 5 and the frequency characteristic of FIG. 8.

As should be understood from the above, the frequency f1 and the frequency f3 are the resonant frequencies in the sound space 40, the frequency f21 is the feedback frequency based on the feedback loop of the system Sb of FIG. 3, and the frequency f22 is the feedback frequency based on the feedback loop of the systems Sc1 and Sc2 of FIGS. 6(*a*) and 6(*b*).

Therefore, in the acoustic system of FIG. 1, the frequency f1 and the frequency f3 may be set in the dip filter 4 as the dip center frequencies.

In the above illustrated example, the system Sb of FIG. 3 is not equipped with a delay device. But, it may be considered that the signal output from the microphone 14 is delayed by zero second and is output to the mixer 16. So, it may be considered that the distinction between the system Sb of FIG. 3 and the systems Sc1 and Sc2 of FIGS. 6(*a*) and 6(*b*) is the difference in the delay time with respect to the signal output from the microphone 14. In other words, it may be considered that the signal output from the microphone 14 is delayed and then output to the mixer 16 with a delay time differed between the system Sb of FIG. 3 and the systems Sc1 and Sc2 of FIGS. 6(*a*) and 6(*b*).

If the delay device 17 in the systems Sc1 and Sc2 of FIGS. 6(*a*) and 6(*b*) is capable of setting the delay time in a predetermined time range, the resonant frequency can be detected so as to be distinguished from the feedback frequency using the systems Sc1 and Sc2 of FIGS. 6*a*) and 6(*b*) without using the system Sb of FIG. 3. That is, measurement by the systems Sc1 and Sc2 of FIGS. 6*a*) and 6(*b*) is conducted twice. It should be remembered that the delay time set in the delay device 17 is not the same in the measurement conducted twice. For example, the delay time is set to 1 millisecond in the first measurement and the delay time is set to 2 millisecond in the second measurement. Also, for example, the delay time is set to 0 millisecond in the first measurement and the delay time is set to 1 millisecond in the second measurement.

By changing the delay time set in the delay device 17 in the systems Sc1 and Sc2 of FIGS. 6*a*) and 6(*b*), the structure of the feedback loop changes. Therefore, as described above, by conducting measurement once in the system Sa of FIG. 2 and by conducting measurement twice in the systems Sc1 and Sc2 of FIGS. 6*a*) and 6(*b*), the resonant frequency can be detected so as to be distinguished from the feedback frequency.

Regarding providing difference (time difference) in the delay time between the first measurement and the second measurement, the following method may be employed. To be specific, the time difference that does not conform to a period of a frequency (e.g., frequency 1) having the positive peak in FIG. 5 is provided.

For example, it is assumed that in the first measurement, the feedback frequency is 200 Hz. In such a case, by setting the time difference between the delay time in the first measurement and the delay time in the second measurement to 5 milliseconds which is the period of the sound wave of 200 Hz, 200 Hz is the feedback frequency in the second measurement. In that case, it is unable to be determined whether 200 Hz is the resonant frequency or the feedback frequency.

In order to determine whether or not the frequencies (frequency f1, the frequency f21, and the frequency f3 in FIG. 5) which may be the resonant frequencies are the resonant frequencies or the feedback frequencies in the second measurement after detecting these frequencies in the first measurement, it is desired that the time difference that does not at least conform to the periods of these frequencies be provided between the delay time in the first measurement and the delay time in the second measurement. For example, it is desired that the time difference that be ¼ of the periods of these frequencies be provided.

Figure 9A:
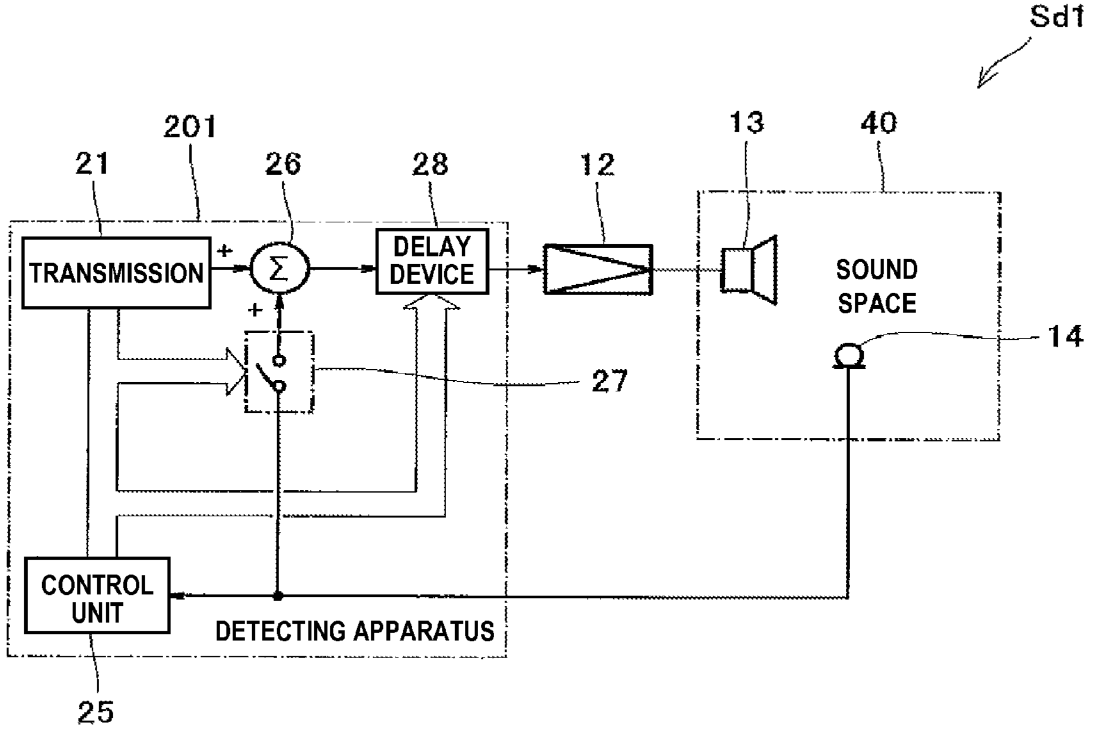
FIGS. 9(*a*) and 9*b*) are schematic block diagrams of a system including a detecting apparatus which is an embodiment of the system for detecting the resonant frequency of the present invention.
Figure 9B:
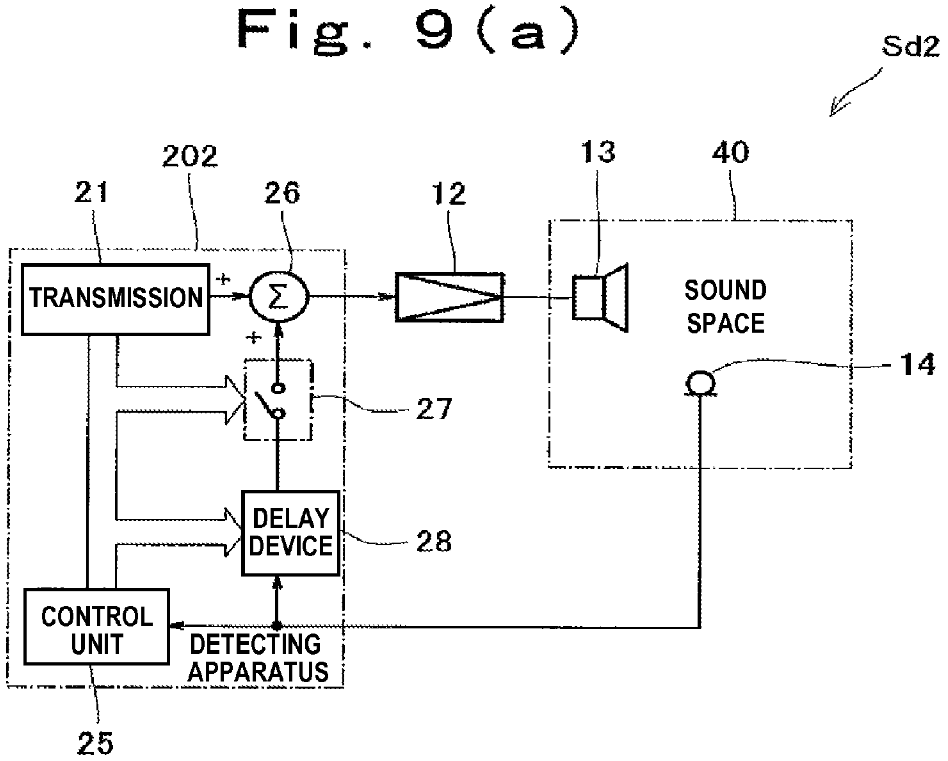

FIGS. 9(*a*) and (9*b*) are a schematic block diagram showing systems Sd1 and Sd2 including detecting apparatus 201 and 202 which is an embodiment of the apparatus for detecting the resonant frequency of the present invention, in which FIG. 9(*a*) shows the detecting apparatus 201 and the system Sd1 and FIG. 9(*b*) shows the detecting apparatus 202 and the system Sd2.

The system Sd1 includes the detecting apparatus 201, the amplifier 12 configured to receive, as an input, the signal output from the detecting apparatus 201 and to power-amplify the signal, the speaker 13 configured to receive, as an input, the signal output from the amplifier 12 and to output a sound wave, and the microphone 14 configured to receive the sound wave emitted from the speaker 13. The system Sd2 includes the detecting apparatus 202, the amplifier 12 configured to receive, as an input, the signal output from the detecting apparatus 202 and to power-amplify the signal, the speaker 13 configured to receive, as an input, the signal output from the amplifier 12 and to output a sound wave, and the microphone 14 configured to receive the sound wave emitted from the speaker 13. Each of the detecting apparatus 201 and 202 receives as the input, the signal output from the microphone 14. The speaker 13 and the microphone 14 are disposed within the sound space (e.g., concert hall or gymnasium) 40. The microphone 14 is positioned so as to receive a reflected sound of the sound wave directly output from the speaker 13 at a sufficiently high level within the sound space 40.

Each of the detecting apparatuses 201 and 202 includes a transmission unit 21, a measurement and control unit 25, a mixer unit 26, an opening and closing unit 27, and a delay device 28 capable of varying delay time. The transmission unit 21 functions as a sound source means configured to output the measurement signal. The measurement and control unit 25 functions as a control means configured to control the respective parts in each of the detecting apparatus 201 and 202, and also functions as a measuring means configured to measure the frequency characteristic. The delay device 28 functions as the delay means. The mixer unit 26, the opening and closing unit 27, and the delay device 28 constitute as a signal switching means.

The system Sd1 and Sd2 are configured such that, in the detecting apparatus 201 and 202, the measurement and control unit 25 controls the transmission unit 21 to cause the transmission unit 21 to output the measurement signal. The measurement signal is a sine wave signal whose frequency varies with time, i.e., a sine wave sweep signal. The sine wave sweep signal has a constant sine wave level at respective time points during frequency sweep.

In the detecting apparatus 201 of FIG. 6(*a*), the mixer unit 26 synthesizes (mixes) the signal output from the transmission unit 21 and the signal from the opening and closing unit 27, and outputs the synthesized signal (mixed signal). The synthesized signal is delayed in the delay device 28 and is input to the amplifier 28. The amplifier 12 power-amplifies the signal and outputs the amplified signal to the speaker 13, which emits a sound wave into the sound space 40. The sound wave in the sound space 40 is received in the microphone 14, and the signal output from the microphone 14 is input to the detecting apparatus 201. In the detecting apparatus 201, the signal output from the microphone is branched and output to the measurement and control unit 25 and to the opening and closing unit 27.

In the detecting apparatus 202 of FIG. 6(*b*), the mixer unit 26 synthesizes (mixes) the signal from the transmission unit 21 and the signal from the opening and closing unit 27 and outputs the synthesized (mixed) signal. The amplifier 12 power-amplifies the signal output from the mixer unit 26. The speaker 13 receives, as an input, the signal output from the amplifier 12 and outputs a sound wave into the sound space 40. The microphone 14 receives the sound wave in the sound space 40. The detecting apparatus 202 receives as an input the signal output from the microphone 14. In the detecting apparatus 202, the signal output from the microphone 14 is branched and output to the measurement and control unit 25 and to the delay device 28. The delay device 28 outputs the signal to the opening and closing unit 27.

In the detecting apparatus 201 and 202, the measurement and control unit 25 has a band pass filter whose center frequency varies with time. The band pass filter varies the center frequency with time according to time variation of the frequency of the sine wave sweep signal output from the transmission unit 21. Therefore, the measurement and control unit 25 detects the level of the signal which has been output from the microphone 14 and has passed through the band pass filter, thus measuring an amplitude characteristic of the frequency at that point of time.

The measurement and control unit 25 is capable of controlling opening and closing of the opening and closing unit 27. The opening and closing unit 27 may be opened to cause the speaker 13 to output a sound wave of only the measurement signal from the transmission unit 21, or may be closed to cause the speaker 13 to output a sound wave of the measurement signal from the transmission unit 21 and the delayed signal of the signal output from the microphone 14.

The measurement and control unit 25 is capable of setting at least two delay times in the delay device 28.

For example, the delay time of the delay device 28 may be set as desired to one of 0 millisecond and 1 millisecond, or to one of 1 millisecond and 2 millisecond. The delay time may be set as desired to one of 0 millisecond, 1 millisecond, and 2 millisecond.

In the systems Sd1 and Sd2 of FIGS. 9(*a*) and 9(*b*), by opening the opening and closing unit 27, the amplitude frequency characteristic can be measured as in the system Sb of FIG. 2.

By closing the opening and closing unit 27 and setting the delay time of the delay device 28 to 0 millisecond, the amplitude frequency characteristic can be measured as in the system Sa of FIG. 3.

By closing the opening and closing unit 27 and by setting the delay time to a predetermined time (e.g., 1 millisecond) other than 0, the amplitude frequency characteristic can be measured as in the case where the predetermined time (e.g., 1 millisecond) is set as the delay time in the delay device 17 of the systems Sc1 and Sc2 of FIGS. 6*a*) and 6(*b*).

As described above, the resonant frequency in the sound space 40 can be detected so as to be distinguished from the feedback frequency from the amplitude frequency characteristic so measured. The measurement and control unit 25 performs calculation to detect the resonant frequency from the measured amplitude frequency characteristic.

Thus far, a procedure in which the delay time of the delay device 28 is set to 0 millisecond and the predetermined time (e.g., 1 millisecond) other than 0, and the resonant frequency is detected in the systems Sd1 and Sd2 has been described. Alternatively, in the systems Sd1 and Sd2, the resonant frequency can be detected by setting the delay time of the delay device 28 to a first delay time (e.g., 1 millisecond) other than 0 and a second delay time (e.g., 2 millisecond) other than 0. In brief, it is necessary that two delay times be switched. One of the delay times may be 0 millisecond and both of them may be time other than 0.

Figure 10A:
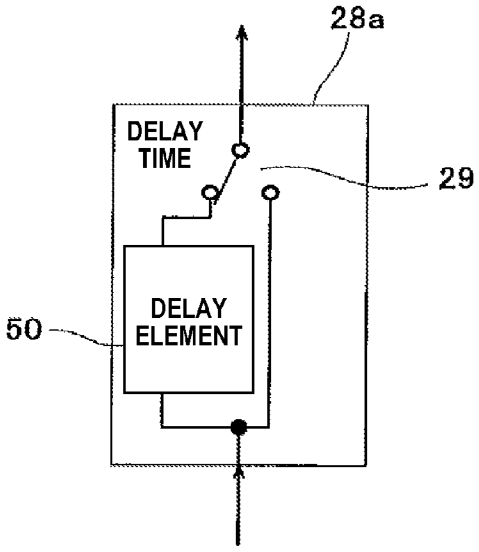
FIGS. 10(*a*) and 10(*b*) are examples of a construction which is employed as a delay device of the detecting apparatus of FIGS. 9(*a*) and 9(*b*)
Figure 10B:
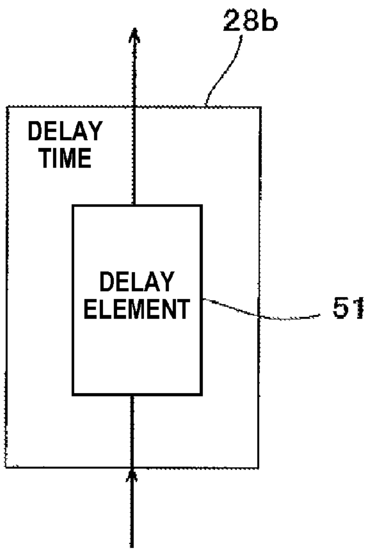

FIGS. 10(*a*) and 10(*b*) are an example of the construction of the delay device 28 in the detecting apparatus 201 and 202 of FIGS. 9(*a*) and 9(*b*). As the delay device 28 (delay device capable of varying the delay time) of FIGS. 9(*a*) and 9(*b*), a delay device 28*a* illustrated in FIG. 10(*a*) may be employed or a delay device 28*b* illustrated in FIG. 10(*b*) may be employed.

The delay device 28*a* of FIG. 10(*a*) includes a switch 29 and a delay element 50 with the delay time set to the predetermined time (e.g., 1 millisecond) other than 0. The switch 29 is controlled to be switched so that the delay time of the delay device 28*a* is switched between 0 millisecond and the predetermined time (e.g., 1 millisecond).

The delay time 28*b* of FIG. 10(*b*) includes a delay element 51 which is capable of as desired setting the delay time in a predetermined time range. The delay time of the delay element 51 may be controlled to be switched between 0 millisecond and 1 millisecond, or between 1 millisecond and 2 milliseconds.

Thus far, the apparatus and method for detecting the resonant frequency so as to be distinguished from the feedback frequency by delaying the signal output from the microphone 14 disposed in the sound space 40 have been described.

Subsequently, an apparatus and method for detecting the resonant frequency so as to be distinguished from the feedback frequency by inverting a phase of the signal output from the microphone 14 disposed in the sound space 40 will be described.

Figure 11A:
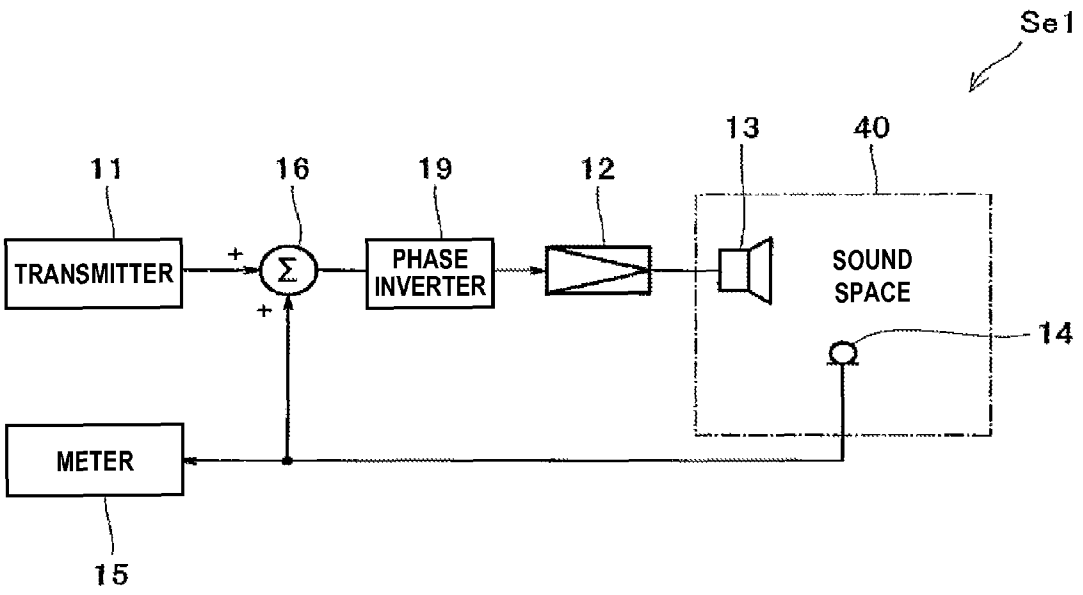
FIGS. 11(*a*) and 11(*b*) are schematic block diagrams of a system for measuring the amplitude frequency characteristic in the sound space.
Figure 11B:
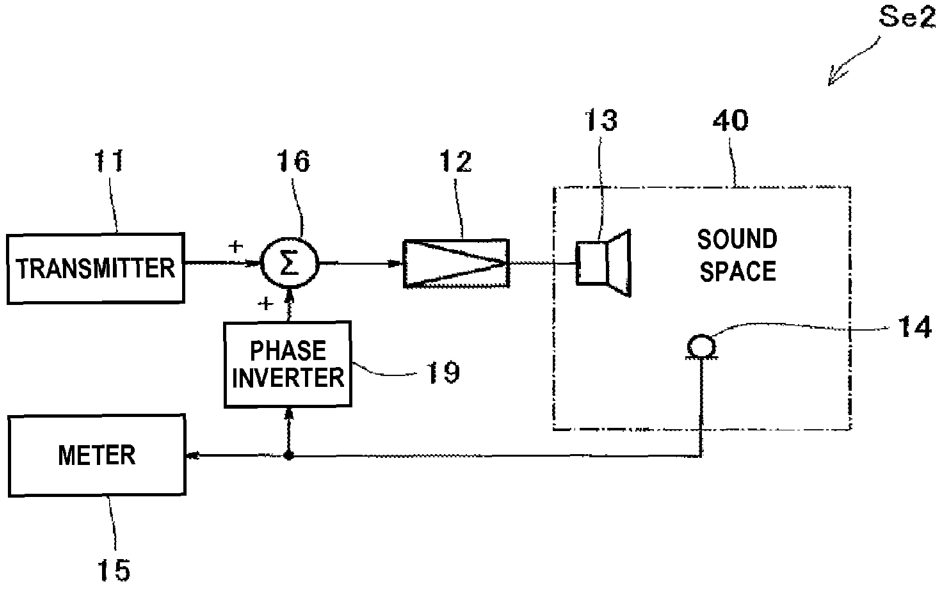

FIGS. 11(*a*) and 11(*b*) are schematic block diagrams of systems Se1 and Set for measuring the amplitude frequency characteristic in the sound space 40, in which FIG. 11(*a*) shows the system Se1 and FIG. 11(*b*) shows the system Set.

The systems Se1 and Set are constructed such that a phase inverter 19 is added to the system Sb of FIG. 3. To be specific, each of the systems Se1 and Se2 of FIGS. 11(*a*) and 11(*b*) comprise the transmitter 11 which is the sound source means configured to output the measurement signal, the mixer 16, the amplifier 12 configured to power-amplify the signal, the speaker 13 configured to receive, as an input, the signal output from the amplifier 12 and to output a sound wave, the microphone 14 configured to receive the sound wave emitted from the speaker 13, the meter 15 configured to receive, as an input, the sound wave output from the microphone 14, and the phase inverter 19 configured to invert the phase of the input signal and to output the phase-inverted signal.

The speaker 13 and the microphone 14 are placed at the same positions within the sound space 40 as those in the system Sa of FIG. 2. The transmitter 11, the amplifier 12, the speaker 13, the microphone 14, and the meter 15 in the systems Se1 and Se2 of FIGS. 11(*a*) and 11(*b*) are identical to those in the system Sa of FIG. 2. In these respects, the systems Se1 and Se2 of FIGS. 11(*a*) and 11(*b*) are identical to the system Sb of FIG. 3.

The systems Se1 and Set of FIGS. 11(*a*) and 11(*b*) are different from the system Sb of FIG. 3. In the system Sb of FIG. 3, the mixer 16 receives as inputs the measurement signal (sine wave sweep signal) from the transmitter 11 and the signal output from the microphone 14, and synthesize these input signals and outputs the synthesized signal to the amplifier 12.

In contrast, in the system Se1 of FIG. 11(*a*), the mixer 16 outputs the synthesized signal of the measurement signal (sine wave sweep signal) from the transmitter 11 and the signal output from the microphone 14 to the phase inverter 19, which inverts the phase of the signal, and outputs the phase-inverted signal to the amplifier 12.

In the system Set of FIG. 11(*b*), the mixer 16 receives as inputs the measurement signal (sine wave sweep signal) from the transmitter 11 and the phase-inverted signal output from the phase inverter 19 that receives as the input, the signal output from the microphone 14, synthesizes (mixes) these input signals, and outputs the synthesized signal to the amplifier 12.

In the systems Se1 and Se2, the speaker 13 outputs a sound wave of the measurement signal and the phase-inverted signal obtained by inverting the phase of the signal output from the microphone 14.

Figure 12:
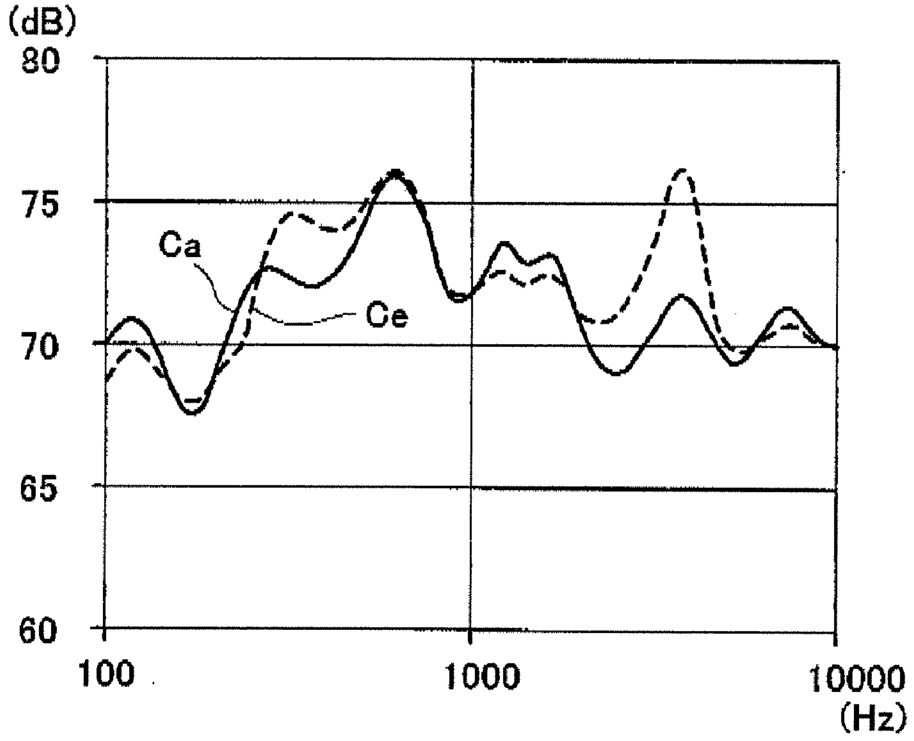
FIG. 12 is a view schematically showing the amplitude frequency characteristic of the sound space measured by the system of FIG. 2 and the amplitude frequency characteristic of the sound space measured by the system of FIGS. 11(*a*) and 11(*b*)

FIG. 12 is a view schematically showing the amplitude frequency characteristic of the sound space 40 measured by the system Sa of FIG. 2 and the amplitude frequency characteristic of the sound space 40 measured by the systems Se1 and Se2 of FIGS. 11(*a*) and 11(*b*). To be precise, the amplitude frequency characteristic measured by the system Se1 of FIG. 11(*a*) and the amplitude frequency characteristic measured by the system Se2 of FIG. 11(*b*) are not the same, but they will be explained as the same below. In FIG. 12, the solid line curve Ca indicates the amplitude frequency characteristic measured by the system Sa of FIG. 2 and the broken line curve Ce indicates the amplitude frequency characteristic measured by the systems Se1 and Se2 of FIGS. 11(*a*) and 11(*b*).

As in the system Sa of FIG. 2 or the system Sb of FIG. 3, the systems Se1 and Set of FIGS. 11(*a*) and 11(*b*) measure amplitude values at a number of frequency points. For example, in a range of frequencies to be measured, the systems Se1 and Set measure the amplitude values at intervals of 1/192 octave. The measurement values at a number of points (a number of frequency points) may be indicated by the curves Ca and Ce as the amplitude frequency characteristics of the sound space 40 without being smoothed on a frequency axis, or otherwise may be indicated by the curves Ca and Ce after they are smoothed in some method or another. The measurement values may be smoothed on the frequency axis in various methods, including moving average, for example. For example, moving average of 9 points may be performed for the measurement values at a number of frequency points on the frequency axis. When the smoothed measurement values are used as the curve Ca, the smoothed measurement values are desirably used as the curve Ce. In this case, the curve Ce is desirably obtained by the same smoothing method as the curve Ca.

As described above, the amplitude frequency characteristic indicated by the solid line curve Ca contains the resonant characteristic of the sound space 40 as well as the characteristic of the electroacoustic system including the amplifier 12, the speaker 13, and the microphone 14.

The systems Se1 and Set of FIGS. 11(*a*) and 11(*b*) includes the feedback loop in which the phase-inverted signal of the signal output from the microphone 14 is input to the amplifier 12 and output from the speaker 13. Therefore, the amplitude frequency characteristic of the broken line curve Ce of FIG. 12 shows not only the characteristic of the electroacoustic system including the amplifier 12, the speaker 13, and the microphone 14, but the resonant characteristic of the sound space 40 that is more noticeable than that of the amplitude frequency characteristic of the solid line curve Ca. The amplitude frequency characteristic of the broken line curve Ce of FIG. 12 also includes the characteristic associated with the feedback loop in which the phase-inverted signal of the signal output from the microphone 14 is input to the amplifier 12 and output from the speaker 13.

Thus, the broken line curve Ce of FIG. 12 is identical to the broken line curve Cb of FIG. 4 in that the resonant characteristic of the sound space 40 is shown noticeably and the characteristic associated with the feedback is shown. But, the structure of the feedback loop of the systems Se1 and Set of FIGS. 11(*a*) and 11(*b*) is not identical to the structure of the feedback loop of the system Sb of FIG. 3 in that the systems Se1 and Set of FIGS. 11(*a*) and 11(*b*) have the phase inverter 19. Therefore, the characteristic associated with the feedback shown in the broken line curve Ce of FIG. 12 is different from the characteristic associated with the feedback shown in the broken line curve Cb of FIG. 4.

Figure 13:
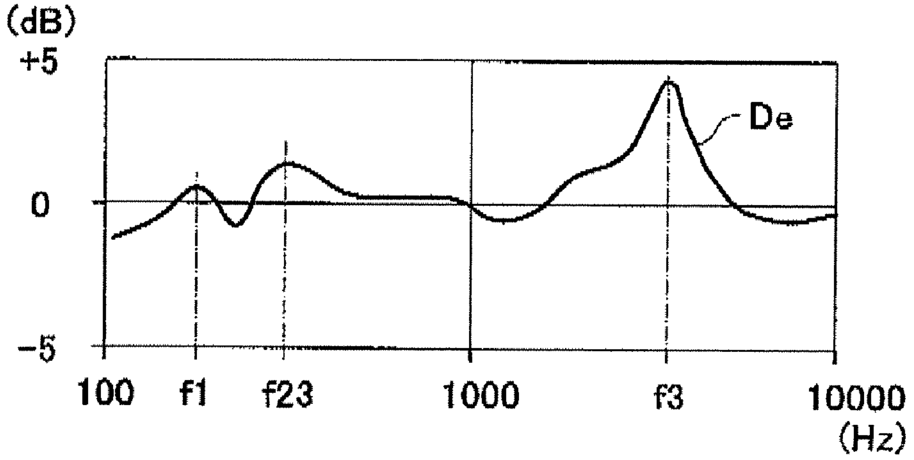
FIG. 13 is a view showing a frequency characteristic obtained by subtracting a solid line curve Ca from a broken line curve Ce in FIG. 12.

A frequency characteristic of FIG. 13 is obtained by subtracting the solid line curve Ca from the broken line curve Ce in FIG. 12. In FIG. 13, frequencies having positive peaks are frequency f1, frequency f23, and frequency f3. It is probable that these frequencies having positive peaks are the resonant frequencies or the feedback frequencies.

Now, the characteristic of FIG. 5 will be compared to the characteristic of FIG. 13. The frequency characteristic of FIG. 5 shows positive peaks at the frequency f1, the frequency f21, and the frequency f3. The frequency characteristic of FIG. 13 shows positive peaks at the frequency f1, the frequency f23, and the frequency f3. The frequency f1 and the frequency f3 have positive peaks in the frequency characteristics of FIGS. 5 and 13. The frequency f21 has the positive peak only in the frequency characteristic of FIG. 5. The frequency f23 has the positive peak only in the frequency characteristic of FIG. 13.

The structure of the feedback loops of the systems Se1 and Set of FIGS. 11(*a*) and 11(*b*) is different from the structure of the feedback loop of the system Sb of FIG. 3. So, the characteristic associated with the feedback shown in the broken line curve Ce of FIG. 12 is different from the characteristic associated with the feedback shown in the broken line curve Cb of FIG. 4. Therefore, it may be considered that the frequency having the positive peak because of the feedback in the frequency characteristic of FIG. 5 is different from the frequency having the positive peak because of the feedback in the frequency characteristic of FIG. 13.

In contrast, it may be considered that the frequency having the positive peak because of the resonance in the sound space 40 is shown in both the frequency characteristic of FIG. 5 and the frequency characteristic of FIG. 13.

As should be understood from the above, the frequency f1 and the frequency f3 are the resonant frequencies of the sound space 40, the frequency f21 is the feedback frequency based on the feedback loop of the system Sb of FIG. 3, and the frequency f23 is the feedback frequency based on the feedback loop of the systems Se1 and Set of FIGS. 11(*a*) and 11(*b*).

Therefore, for example, in the acoustic system of FIG. 1, the frequency f1 and the frequency f3 are set as the dip center frequencies in the dip filter 4.

Figure 14A:
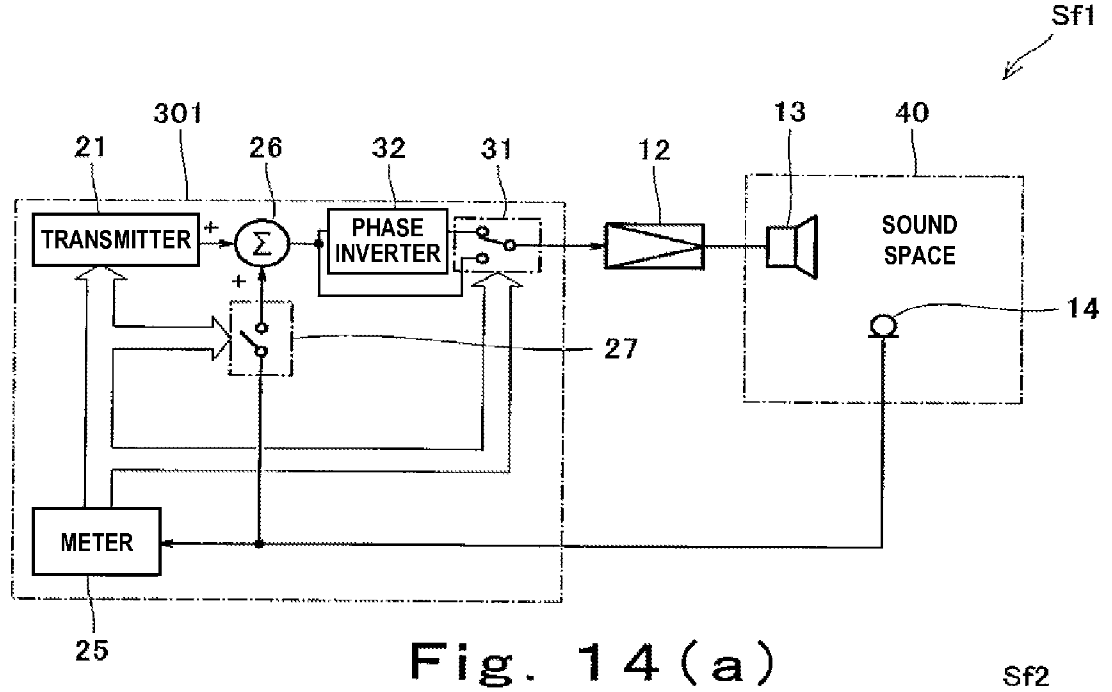
FIGS. 14(*a*) and 14(*b*) are schematic block diagrams of a system including a detecting apparatus which is an embodiment of the apparatus for detecting the resonant frequency of the present invention.
Figure 14B:
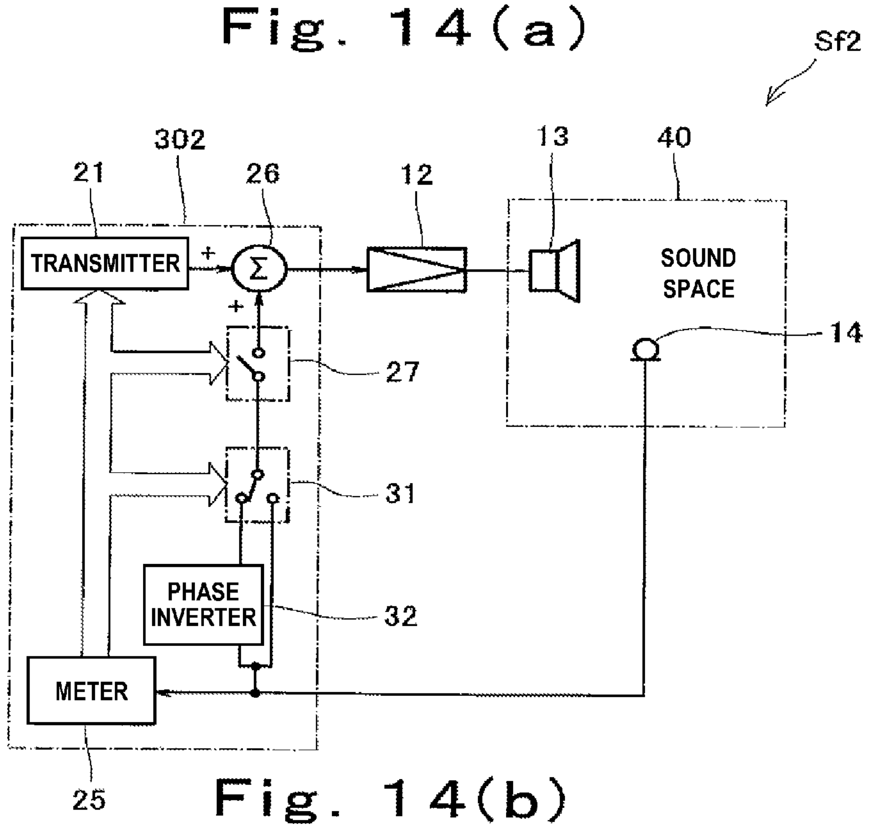

FIGS. 14(*a*) and 14(*b*) are schematic block diagrams of systems Sf1 and Sf2 including detecting apparatus 301 and 302 which are an embodiment of the apparatus for detecting the resonant frequency of the present invention, in which FIG. 14(*a*) shows the detecting apparatus 301 and the system Sf1 and FIG. 14(*b*) shows the detecting apparatus 302 and the system Sf2.

The system Sf1 includes the detecting apparatus 301, the amplifier 12 configured to receive, as an input, the signal output from the detecting apparatus 301 and to power-amplify the signal, the speaker 13 configured to receive, as an input, the signal output from the amplifier 12 and to output a sound wave, and the microphone 14 configured to receive the sound wave emitted from the speaker 13. The system Sf2 includes the detecting apparatus 302, the amplifier 12 configured to receive, as an input, the signal output from the detecting apparatus 302 and to power-amplify the signal, the speaker 13 configured to receive, as an input, the signal output from the amplifier 12 and to output a sound wave, and the microphone 14 configured to receive the sound wave emitted from the speaker 13. Each of the detecting apparatus 301 and 302 receives as the input, the signal output from the microphone 14. The speaker 13 and the microphone 14 are disposed within the sound space (e.g., concert hall or gymnasium) 40. The microphone 14 is positioned so as to receive a reflected sound of the sound wave directly output from the speaker 13 at a sufficiently high level within the sound space 40.

Each of the detecting apparatus 301 and 302 includes the transmission unit 21, the measurement and control unit 25, the mixer unit 26, the opening and closing unit 27, the switch 31, and the phase inverter 32. The transmission unit 21 functions as the sound source means for outputting the measurement signal. The measurement and control unit 25 functions as a control means for controlling portions within the detecting apparatus 302 and 302, and as a measuring means for measuring the frequency characteristic. The phase inverter 32 functions as the phase inverter means. The mixer unit 26, the opening and closing unit 27, the switch 31, and the phase inverter 32 constitute a signal switching means.

The systems Sf1 and Sf2 are configured such that, in the detecting apparatus 301 and 302, the measurement and control unit 25 controls the transmission unit 21 to cause the transmission unit 21 to output the measurement signal. The measurement signal is a sine wave signal whose frequency varies with time, i.e., a sine wave sweep signal. The sine wave sweep signal has a constant sine wave level at respective time points during frequency sweep.

The mixer unit 26 synthesizes (mixes) the signal output from the transmission unit 21 and the signal from the opening and closing unit 27, and outputs the synthesized signal (mixed signal). The synthesized signal is input to the amplifier 12, which power-amplifies the signal and outputs the amplified signal to the speaker 13, which emits a sound wave into the sound space 40. The sound wave in the sound space 40 is received in the microphone 14, and the sound wave from the microphone 14 is input to the detecting apparatus 301 and 302.

In the detecting apparatus 301 of FIG. 14(*a*), the signal output from the microphone 14 is branched and output to the measurement and control unit 25 and to the opening and closing unit 27. The signal output from the mixer unit 26 is branched and output to the phase inverter 32 and to the switch 31. The signal output from the phase inverter 32 is input to the switch 31. The signal output from the switch 31 is input to the amplifier 12.

In the detecting apparatus 302 of FIG. 14(*b*), the signal output from the microphone 14 is branched and output to the measurement and control unit 25, to the phase inverter 32, and to the switch 31. The signal output from the phase inverter 32 is input to the switch 31. The switch 31 is connected to the opening and closing unit 27. The signal output from the mixer unit 26 is input to the amplifier 12.

In the detecting apparatus 301 and 302, the measurement and control unit 25 has a band pass filter whose center frequency varies with time. The band pass filter varies the center frequency with time according to time variation of the frequency of the sine wave sweep signal output from the transmission unit 21. Therefore, the measurement and control unit 25 detects the level of the signal that has been output from the microphone 14 and has passed through the band pass filter, thus measuring an amplitude characteristic of the frequency at that point of time.

The measurement and control unit 25 is capable of controlling opening and closing of the opening and closing unit 27. The opening and closing unit 27 may be opened to cause the speaker 13 to output a sound wave of only the measurement signal from the transmission unit 21, or may be closed to cause the speaker 13 to output a sound wave of the measurement signal from the transmission unit 21 and the signal output from the microphone 14.

The measurement and control unit 25 is capable of controlling the state of the switch 31 so that the speaker 13 outputs a sound wave of the signal output from the microphone 14 without inverting its phase or the speaker 13 outputs a sound wave of the signal that has been output from the microphone 14 and has been inverted in the phase inverter 32.

By opening the opening and closing unit 27, the amplitude frequency characteristic can be measured as in the system Sa of FIG. 2.

By closing the opening and closing unit 27 and by setting the switch 31 so that the speaker 13 outputs the sound wave of the signal output from the microphone 14 without inverting its phase, the amplitude frequency characteristic can be measured as in the system Sb of FIG. 3.

By closing the opening and closing unit 27 and by setting the switch 31 so that the speaker 13 outputs the sound wave of the signal that has been output from the microphone 14 and has been inverted in the phase inverter 32, the amplitude frequency characteristic can be measured as in the systems Se1 and Set of FIGS. 11(*a*) and 11(*b*).

As described above, the resonant frequency in the sound space 40 can be detected so as to be distinguished from the feedback frequency from the amplitude frequency characteristic so measured. The measurement and control unit 25 performs calculation to detect the resonant frequency from the measured amplitude frequency characteristic.

Thus far, the apparatus and method for detecting the resonant frequency so as to be distinguished from the feedback frequency by inverting the phase of the signal output from the microphone 14 disposed in the sound space 40 have been described.

In the apparatus and method (apparatus and method described with reference to FIGS. 1 to 14), the transmitter or the transmission unit is configured to output the sine wave sweep signal as the measurement signal. As the measurement signal, various signals, as well as the sine weep signal may be used. For example, a noise signal containing a component within a predetermined frequency bandwidth and having a center frequency that sweeps can be employed may be used. In this case, the frequency bandwidth is preferably set to ⅓ octave or less, more preferably to ⅙ octave or less. As the measurement signal, for example, a pink noise may be used. In this case, of course, the meter (measuring means) need not have a band pass filter whose center frequency varies with time.

Subsequently, the apparatus and method for detecting the resonant frequency by outputting a reference frequency signal from a speaker installed in the sound space will be described.

Figure 15:
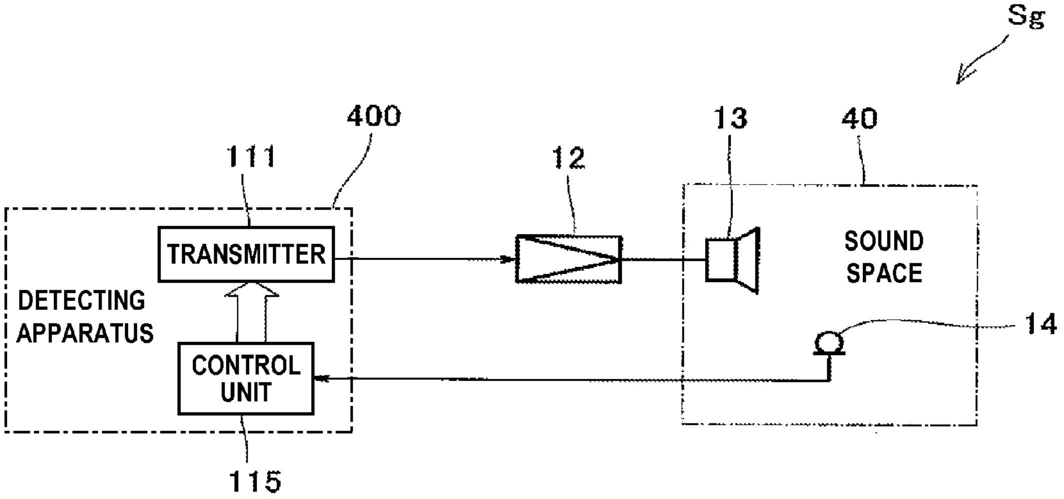
FIG. 15 is a schematic block diagram of a system for detecting the resonant frequency in the sound space (e.g., concert hall or gymnasium)

FIG. 15 is a schematic block diagram of a system and a detecting apparatus (resonant frequency detecting apparatus) for detecting a resonant frequency in the sound space (e.g., concert hall or gymnasium) 40.

The system Sg of FIG. 15 comprises a transmitter 111 which is a sound source means configured to output a measurement signal, the amplifier 12 configured to receive, as an input, the signal output from the transmitter 111 and to power-amplify the signal, a speaker 13 configured to receive, as an input, the signal output from the amplifier 12 and to output a sound wave, a microphone 14 configured to receive the sound wave emitted from the speaker 13, and a measurement and control unit 115 configured to receive as the input the signal from the microphone 14. The microphone 14 may be a noise level meter. The measurement and control unit 115 controls the transmitter 111. To be specific, the measurement and control unit 115 is able to control the frequency of the measurement signal output from the transmitter 111 or the time interval of the measurement signal. The measurement and control unit 115 functions as the measuring means for measuring an attenuation property of the signal output from the microphone 14. The transmitter 111, and the measurement and control unit 115 constitute a detecting apparatus 400.

The speaker 13 and the microphone 14 are placed within the sound space 40. The microphone 14 is positioned so as to receive a reflected sound of the sound wave directly output from the speaker 13 at a sufficiently high level within the sound space 40.

The measurement signal output from the transmitter 111 of the system Sg is a signal in which the reference frequency signal is repeated intermittently plural times. As used herein, the reference frequency signal is a sine wave signal with a specific frequency or a signal containing a component with a predetermined frequency bandwidth having the specific frequency at a center thereof. The signal containing the component including the predetermined frequency bandwidth having the specific frequency at the center is, for example, a noise signal having a frequency component with ⅓ octave width having 200 Hz at the center. Such a reference frequency signal is less affected by the noise such as background noise. As a result, reliable measurement is achieved.

Figure 16:
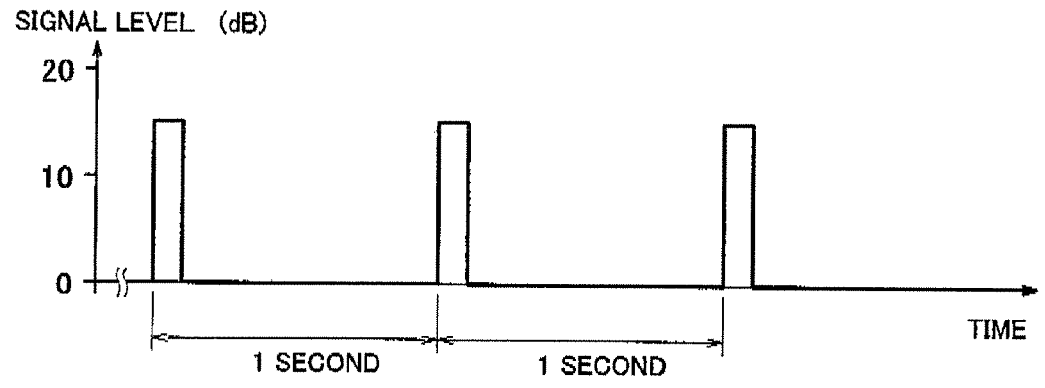
FIG. 16 is a view showing a signal level of a measurement signal on a time axis.

FIG. 16 is a view showing a signal level of the measurement signal on a time axis. For example, the sine wave with the specific frequency of 200 Hz continued for 0.1 second is output. After a time period of 0.9 second, the sine wave continued for 0.1 second is output. Further, after a time period of 0.9 second, the sine wave continued for 0.1 second is output. That is, the sine wave with 200 Hz continued for 0.1 second is output three times intermittently Whereas the sine wave with 200 Hz continued for 0.1 second is output plural times at equal time intervals in this embodiment as shown in FIG. 16, it is not necessarily output at equal time intervals. For example, the sine wave with the specific frequency continued for a predetermined time may be output plural times at random time intervals.

Figure 17:
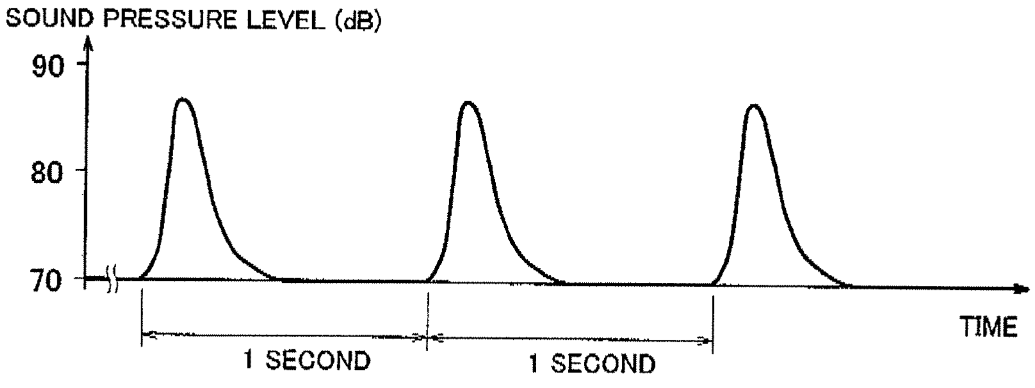
FIG. 17 is a view showing a sound pressure level measured by a microphone on the time axis.

FIG. 17 is a view showing a sound pressure level measured by the microphone 14 on the time axis. The sound pressure level has three peaks occurring at one second intervals so as to be synchronous with the measurement signal shown in FIG. 16. However, the sound pressure level attenuates quickly. It is considered that in a case where the sound pressure level attenuates quickly in the sound space, the specific frequency (200 Hz) of the measurement signal is not the resonant frequency.

Figure 18:
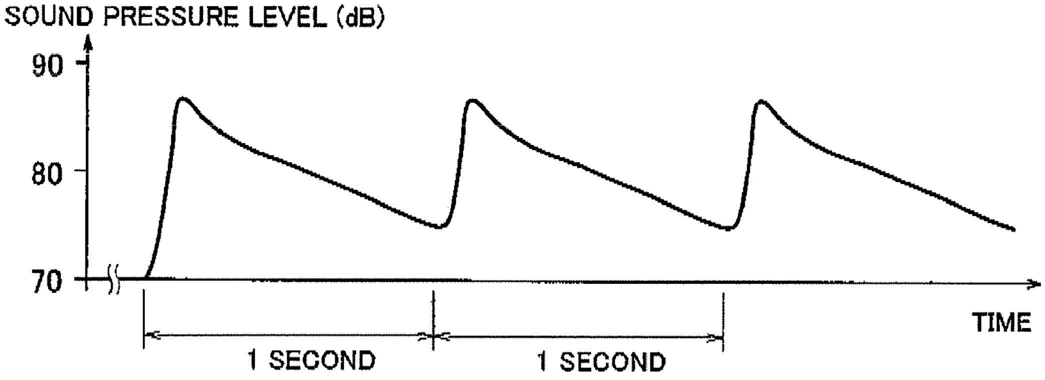
FIG. 18 is a view showing a sound pressure level measured by the microphone on the time axis.

FIG. 18 is a view showing a sound pressure level measured by the microphone 14 on the time axis, when the measurement signal having the specific frequency of 250 Hz is output from the speaker 13 of the system Sg of FIG. 15. The reference frequency signal with the specific frequency of 250 Hz continued for 0.1 second is output from the transmitter 111. After a time period of 0.9 second, the reference frequency signal continued for 0.1 second is output again. Further, after a time period of 0.9 second, the reference frequency signal continued for 0.1 second is output. That is, the sine wave with 250 Hz continued for 0.1 second is output three times intermittently As can be seen from FIG. 18, the sound pressure level measured within the sound space 40 has three peaks occurring at one second intervals so as to be synchronous with the measurement signal. The sound pressure level attenuates gradually. It is considered that in a case where the sound pressure level attenuates gradually in the sound space 40, the specific frequency (250 Hz) of the measurement signal is the resonant frequency of the sound space 40.

As should be understood from the above, to determine the resonant frequency from the attenuation property of the sound pressure level in the sound space 40, it is not always necessary to emit the reference frequency signal from the speaker 13 plural times. For example, the resonant frequency can be determined from the attenuation property of the sound pressure level in the sound space 40 by emitting once the reference frequency signal continued for several seconds from the speaker 13. For example, the resonant frequency can be determined by whether or not the sound pressure level attenuates more slowly than a predetermined rate.

To determine whether the sound pressure level in the sound space 40 attenuates gradually or quickly, an area of a region surrounded by a sound pressure level line curve on the view showing the sound pressure level on the time axis of FIG. 18 may be calculated. That is, it may be determined that the sound pressure level attenuates quickly if the area is small, whereas it may be determined that the sound pressure level attenuates gradually if the area is large.

Figure 19:
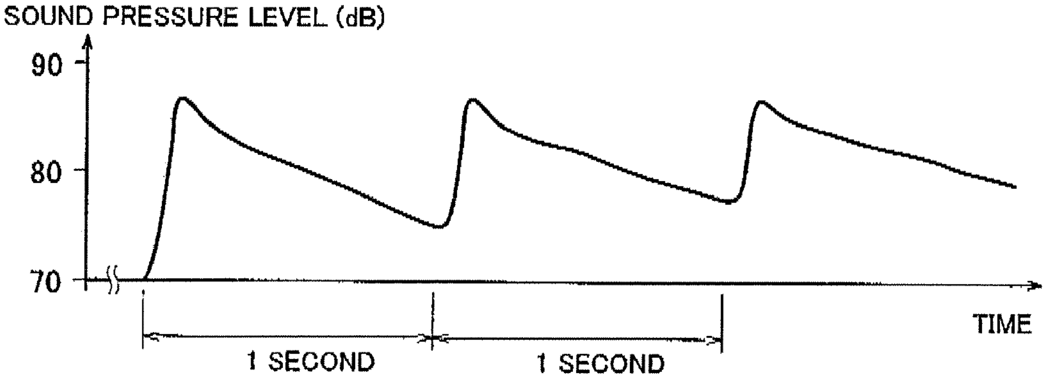
FIG. 19 is a view showing a sound pressure level measured by the microphone on the time axis.

FIG. 19 is a view showing the sound pressure level measured by the microphone 14 on the time axis, when the measurement signal having the specific frequency of 300 Hz is output from the speaker 13 of the system Sg of FIG. 15. The reference frequency signal with the specific frequency of 300 Hz continued for 0.1 second is output from the transmitter 111. After a time period of 0.9 second, the reference frequency signal continued for 0.1 second is output again. Further, after a time period of 0.9 second, the reference frequency signal continued for 0.1 second is output. That is, the sine wave with 300 Hz continued for 0.1 second is output three times intermittently As can be seen from FIG. 19, the sound pressure level measured within the sound space 40 has three peaks occurring at one second intervals so as to be synchronous with the measurement signal. The sound pressure level attenuates gradually. The sound pressure level attenuates from a second peak more gradually than from a first peak. The sound pressure level attenuates from a third peak more gradually than from the second peak. The reason why the sound pressure level attenuates gradually in steps may be that a sufficient energy of the sound wave output previously remains in the sound space 40 until a next sound wave is output. In this case, it is probable that the specific frequency (300 Hz) of the measurement signal is the resonant frequency in the sound space 40.

The resonant frequency of the sound space 40 can be detected by determining the state of an attenuation process of the sound pressure level of the sound space 40 by the measurement and control unit 115 while gradually changing the specific frequency of the measurement signal. One configuration to gradually change the specific frequency of the measurement signal is to increase the specific frequency in steps by 1/48 octave.

Figure 20:
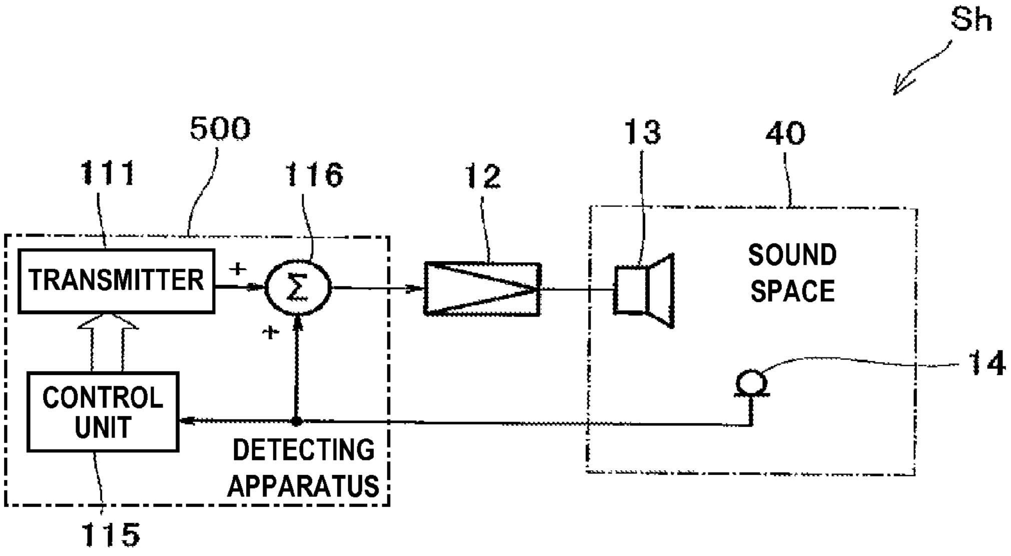
FIG. 20 is a schematic block diagram of a system for detecting the resonant frequency in the sound space (e.g., concert hall or gymnasium)

FIG. 20 is a block diagram schematically showing a system and a detecting apparatus (resonant frequency detecting apparatus) for detecting the resonant frequency in the sound space (e.g., concert hall or gymnasium) 40.

As in the system Sg of FIG. 15, the system Sh of FIG. 20 comprises the transmitter 111 which is a sound source means configured to output a measurement signal, the amplifier 12, the speaker 13 configured to receive, as an input, the signal output from the amplifier 12 and to output a sound wave, the microphone 14 configured to receive the sound wave emitted from the speaker 13, and the measurement and control unit 115 configured to receive as the input, the signal output from the microphone 14. The measurement and control unit 115 is capable of controlling the frequency or the time intervals of the measurement signal output from the transmitter 111. The measurement and control unit 115 functions as the measuring means for measuring the attenuation property of the signal output from the microphone 14.

A detecting apparatus 500 includes the transmitter 111, the measurement and control unit 15, and a mixer unit 116.

The system Sh of FIG. 20 is different from the system Sg of FIG. 15 in that in the system Sh of FIG. 20, the mixer unit 116 mixes (synthesizes) the measurement signal from the transmitter 111 and the signal output from the microphone 14, and outputs the synthesized signal to the amplifier 12. The mixer unit 116 functions as a signal output means. As described above, the resonance of the round space 40 shows a more noticeable effect by providing the feedback loop.

As in the system Sg of FIG. 15, the system Sh of FIG. 20 is able to detect the resonant frequency in the sound space 40. Besides, the system Sh is able to detect the resonant frequency more accurately than the system Sg of FIG. 15.

Figure 21A:
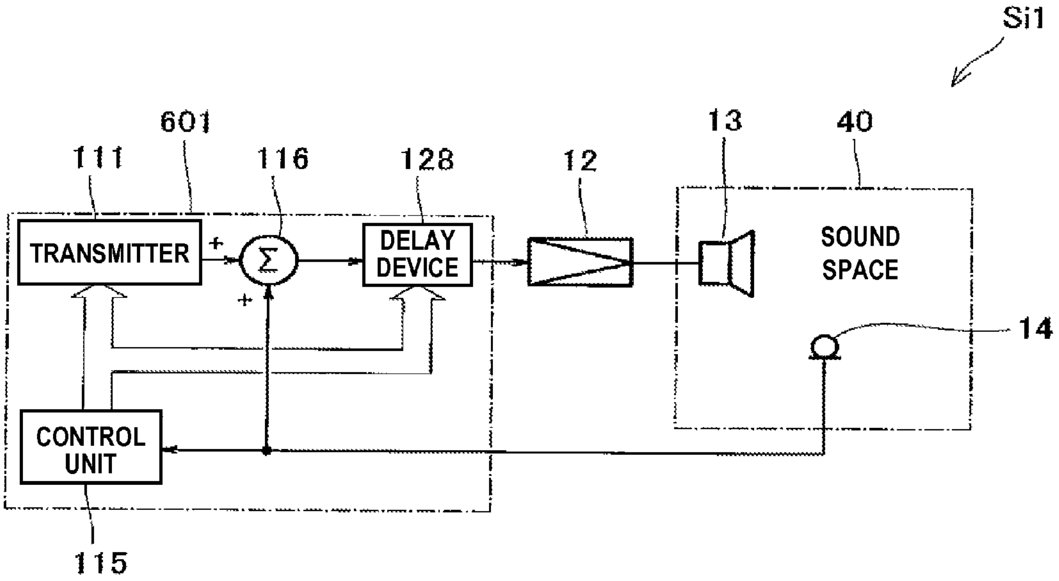
FIGS. 21(*a*) and 21(*b*) are schematic block diagrams of a system for detecting the resonant frequency in the sound space (e.g., concert hall or gymnasium)
Figure 21B:
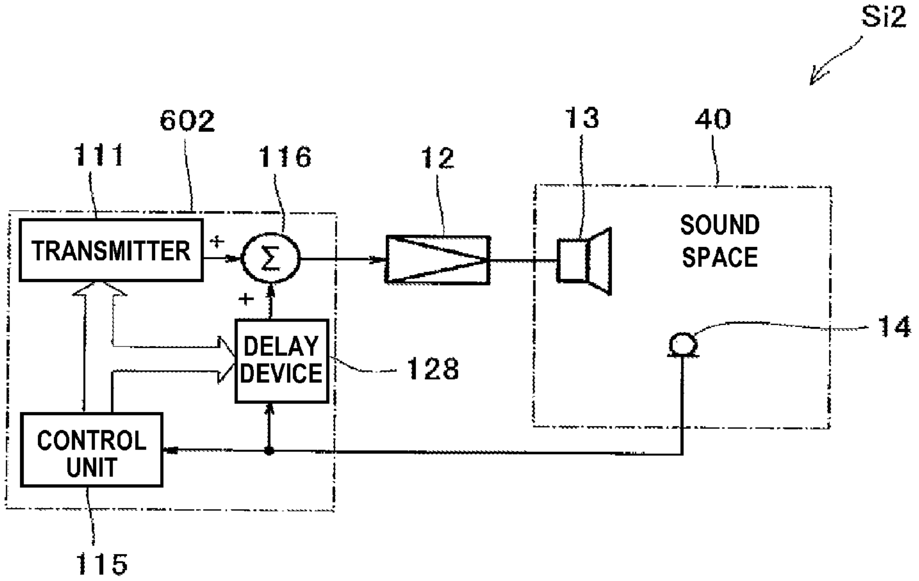

FIGS. 21(*a*) and 21(*b*) are schematic block diagrams of a system and a detecting apparatus (resonant frequency detecting apparatus) for detecting the resonant frequency in the sound space (e.g., concert hall or gymnasium) 40, in which FIG. 21(*a*) shows a system Si1 and a detecting apparatus 601, and FIG. 21(*b*) shows a system Si2 and a detecting apparatus 602.

As in the system Sg of FIG. 15, each of the systems Si1 and Si2 comprises the transmitter 111 which is a sound source means configured to output the measurement signal, the amplifier 12, the speaker 13 configured to receive, as an input, the signal output from the amplifier 12 and to output a sound wave, the microphone 14 configured to receive the sound wave emitted from the speaker 13, and the measurement and control unit 115 configured to receive as an input the signal output from the microphone 14. The measurement and control unit 115 is capable of controlling the frequency or the time intervals of the measurement signal output from the transmitter 111. The measurement and control unit 115 functions as the measuring means for measuring an attenuation property of the signal output from the microphone 14.

In the system Si1 of FIG. 21(*a*), the detecting apparatus 601 includes the transmitter 111, the measurement and control unit 115, the mixer unit 116 and a delay device 128. The mixer unit 116 synthesizes the measurement signal from the transmitter 111 and the signal output from the microphone 14 and received as the input in the detecting apparatus 601. The detecting apparatus 601 outputs the synthesized signal through the delay device 128. The signal is output from the detecting apparatus 601 to the amplifier 12. The signal output from the microphone 14 and received as the input in the detecting apparatus 601 is branched and output to the measurement and control unit 115 and to the mixer unit 116.

In the system Si2 of FIG. 21(*b*), the detecting apparatus 602 includes the transmitter 111, the measurement and control unit 115, the mixer unit 116 and the delay device 128. The mixer unit 116 synthesizes the measurement signal from the transmitter 111 and the signal output from the delay device 128. The detecting apparatus 601 outputs the synthesized signal. The signal output from the microphone 14 and received as the input in the detecting apparatus 601 is branched and output to the delay device 128 and to the measurement and control unit 115.

The systems Si1 and Si2 of FIGS. 21(*a*) and 21(*b*) are different from the system Sg of FIG. 15 in that in the systems Si1 and Si2 of FIGS. 21(*a*) and 21(*b*), the speaker 13 outputs a sound wave of the measurement signal from the transmitter 111 and a sound wave of the signal that has been output from the microphone 14 and passed through the delay device 128.

As described above, the resonance in the sound space 40 shows a more noticeable effect by providing the feedback loop. In the detecting apparatus 601 and 602 of the systems Si1 and Si2, the mixer unit 116 and the delay device 128 constitute a signal output means.

The delay device 128 is controlled by the measurement and control unit 115. To be specific, the measurement and control unit 115 is able to set as desired a delay time of the delay device 128 within a predetermined time range. For example, the delay time of the delay device 128 may be set as desired to 0 millisecond, 1 millisecond or 2 millisecond.

For example, in measurement by the systems Si1 and Si2, the sine wave with the specific frequency of 250 Hz continued for 0.1 second is output from the transmitter 111. After a time period of 0.9 second, the sine wave continued for 0.1 second is output again. Further, after a time period of 0.9 second, the sine wave continued for 0.1 second is output. That is, the sine wave with 250 Hz continued for 0.1 second is output three times intermittently.

Figure 22:
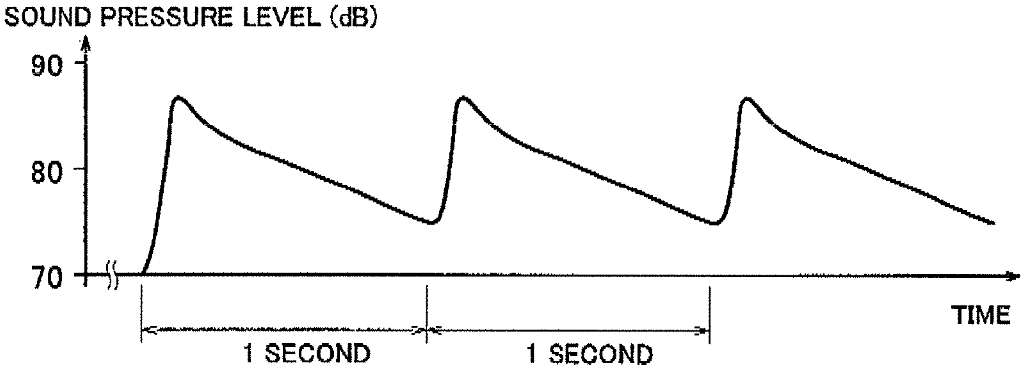
FIG. 22 is a view showing a sound pressure level measured by the microphone on the time axis.

FIG. 22 is a view showing the sound pressure level measured by the microphone 14 on the time axis, when the above described measurement signal is output from the transmitter 111 of the detecting apparatus 601 and 602. The delay time of the delay device 128 is set to 0 millisecond.

As can be seen from FIG. 22, the sound pressure level curve shows three peaks occurring at one second intervals so as to be synchronous with the measurement signal. The sound pressure level attenuates gradually. It is considered that in a case where the sound pressure level attenuates gradually in the sound space, the specific frequency (250 Hz) of the measurement signal is the resonant frequency of the sound space 40. However, there is a possibility that this specific frequency (250 Hz) is not the resonant frequency but the feedback frequency. Even if the specific frequency (250 Hz) is the feedback frequency, the sound level attenuates gradually.

In order to determine the specific frequency (250 Hz) is the resonant frequency or the feedback frequency, similar measurement is conducted while changing the delay time of the delay device 128. The transmitter 111 outputs the sine wave with 250 Hz continued for 0.1 second three times intermittently. In a case where the sound pressure level in the round space 40 is measured to be synchronous with the first output, the delay time of the delay device 128 is set to, for example, 0 millisecond. In a case where the sound pressure level in the round space 40 is measured to be synchronous with the second output, the delay time of the delay device 128 is set to, for example, 1 millisecond. In a case where the sound pressure level in the round space 40 is measured to be synchronous with the third output, the delay time of the delay device 128 is set to, for example, 2 millisecond.

The resonant frequency is determined only by the feature of the sound space 40, and therefore, does not change if the structure of the feedback loop changes. When the specific frequency (250 Hz) is the resonant frequency, then the rate with which the sound pressure level measured within the sound space 40 does not change if the delay time of the delay device 128 is changed.

However, the feedback frequency changes if the structure of the feedback loop changes. The structure of the feedback loop changes if the delay time of the delay device 128 changes. Therefore, when the specific frequency (250 Hz) is the feedback frequency in the state in which the delay device of the delay device 128 is set to 0 m, the rate with which the sound pressure level measured within the sound space 40 attenuates changes if the delay time of the delay device 128 changes.

Figure 23:
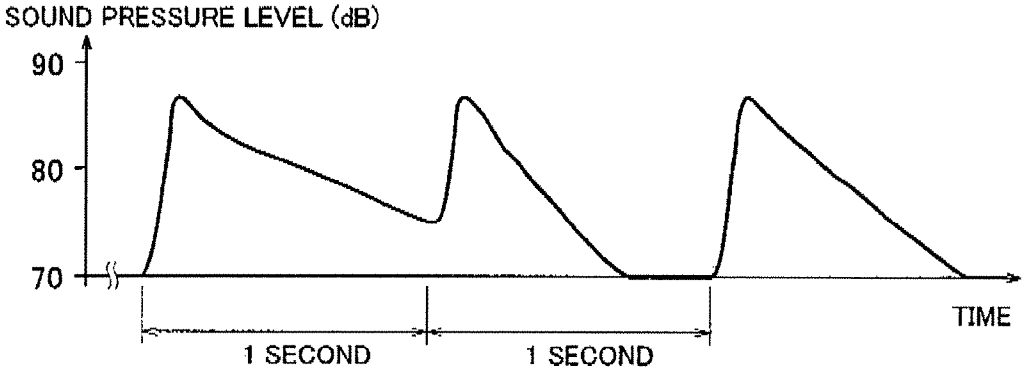
FIG. 23 is a view showing a sound pressure level measured by the microphone on the time axis.

FIG. 23 is a view showing a sound pressure level measured by the microphone 14 on the time axis, when the measurement signal is output from the transmitter 111 while changing the delay time of the delay device 128. To be specific, the sound pressure level curve measured by the system Si1 of FIG. 21(*a*) is not identical to the sound pressure level measured by the system Sit of FIG. 21(*b*), but they are described as the same.

As can be seen from FIG. 23, the sound pressure level curve shows three peaks occurring at one second intervals so as to be synchronous with the measurement signal. The sound pressure level of the sound space 40 corresponding to a first output from the transmitter 111 attenuates gradually. The sound pressure level of the sound space 40 corresponding to a second output from the transmitter 111 attenuates relatively quickly. The sound pressure level of the sound space 40 corresponding to a third output from the transmitter 111 attenuates slightly gradually.

Thus, because the rate with which the sound pressure level in the sound space 40 attenuates changes by changing the delay time of the delay device 128, it can be determined that the specific frequency (250 Hz) of the measurement signal is not the resonant frequency.

The resonant frequency in the sound space 40 can be detected so as to be distinguished from the feedback frequency by determining the state of an attenuation process of the sound pressure level of the sound space 40 by the measurement and control unit 115 while gradually changing the specific frequency of the measurement signal.

Figure 24A:
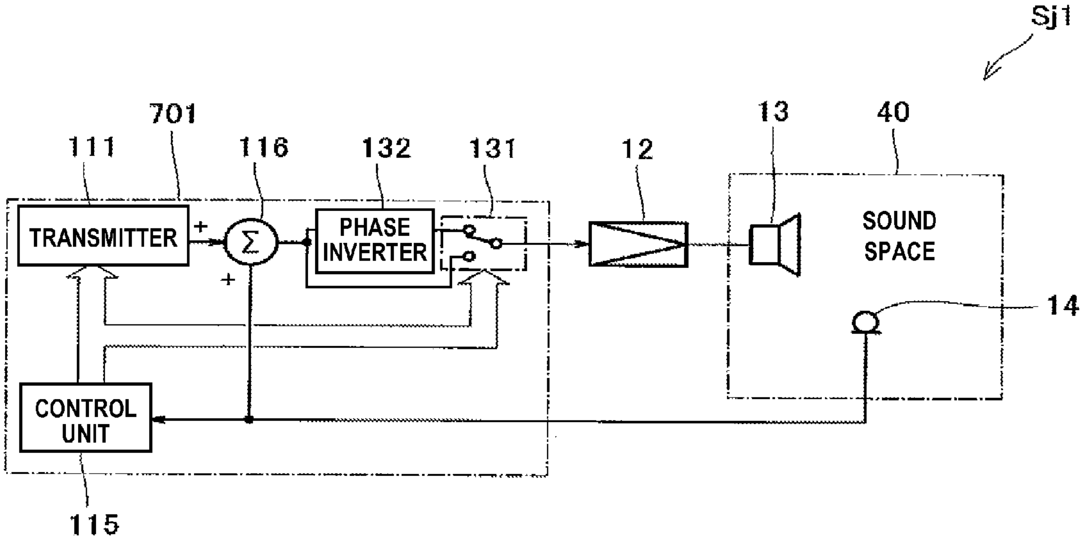
FIGS. 24(*a*) and 24(*b*) are schematic block diagrams of a system for detecting the resonant frequency in the sound space (e.g., concert hall or gymnasium)
Figure 24B:
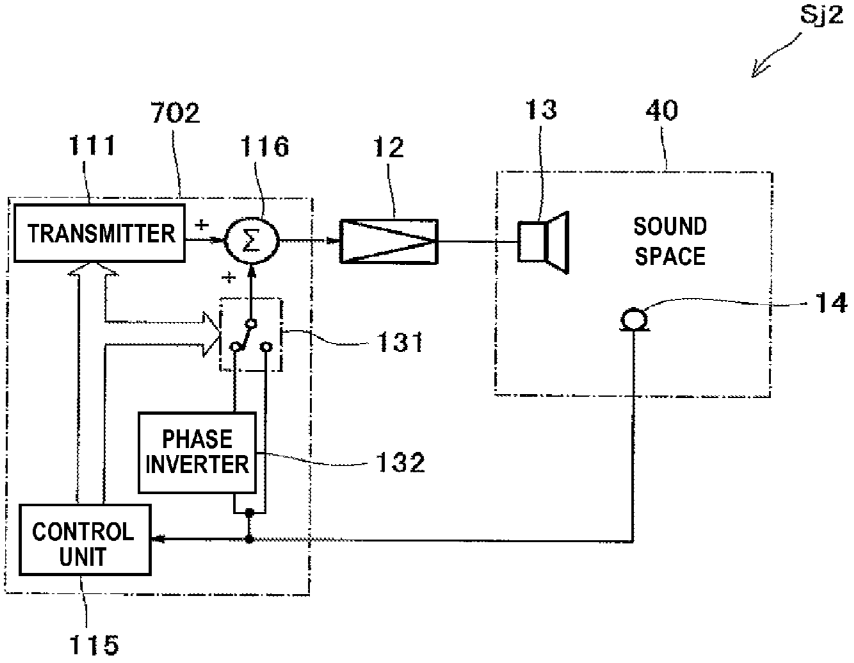

FIGS. 24(*a*) and 24(*b*) are schematic block diagrams of a system and a detecting apparatus (resonant frequency detecting apparatus) for detecting a resonant frequency in the sound space (e.g., concert hall or gymnasium) 40, in which FIG. 24(*a*) shows a system Sj1 and a detecting apparatus 701, and FIG. 24(*b*) shows a system Sj2 and a detecting apparatus 702.

As in the system Sg of FIG. 15, each of the systems Sj1 and Sj2 of FIGS. 24(*a*) and 24(*b*) comprises the transmitter 111 which is a sound source means configured to output a measurement signal, the amplifier 12, the speaker 13 configured to receive, as an input, the signal output from the amplifier 12 and to output a sound wave, the microphone 14 configured to receive the sound wave emitted from the speaker 13, and the measurement and control unit 115 configured to receive as the input, the signal output from the microphone 14. The measurement and control unit 115 is capable of controlling the frequency or the time interval of the measurement signal output from the transmitter 111. The measurement and control unit 115 functions as the measuring means for measuring the attenuation characteristic of the signal output from the microphone 14.

The detecting apparatus 701 of FIG. 24(*a*) includes the transmitter 111 as the sound source means, the measurement and control unit 115, the mixer unit 116, the switch 131, and the phase inverter 132. In the detecting apparatus 701, the signal output from the microphone 14 is branched and output to the measurement and control unit 115 and to the mixer unit 116. The measurement signal from the transmitter 111 is input to the mixer unit 116. The mixer unit 116 synthesizes the signal output from the microphone 14 and the measurement signal from the transmitter 111. The synthesized signal is branched and output to the phase inverter 132 and to the switch 131. The signal is output from the phase inverter 132 to the switch 131. The signal is output from the switch 131 to the amplifier 12.

The detecting apparatus 702 of FIG. 24(*b*) includes the transmitter 111 as the sound source means, the measurement and control unit 115, the mixer unit 116, the switch 131, and the phase inverter 132. In the detecting apparatus 702, the signal output from the microphone 14 is branched and output to the measurement and control unit 115, to the phase inverter 132 and to the switch 131. The signal is output from the phase inverter 132 to the switch 131. The signal is output from the switch 31 to the mixer unit 116. The signal from the transmitter 111 is input to the mixer unit 116. The mixer unit 116 synthesizes the measurement signal from the transmitter 111 and the signal from the switch 131, and outputs the synthesized signal to the amplifier 12.

In the systems Sj1 and Sj2, the speaker 13 outputs a sound wave of the measurement signal. Also, the speaker 13 outputs a sound wave of the signal output from the microphone 14 or the phase-inverted signal obtained by inverting the phase of the signal output from the microphone 14. In the detecting apparatus 701 and 702 of the systems Sj1 and Sj2, the mixer unit 116, the switch 131, and the phase inverter 132 constitute a signal output means.

The switch 131 is switched so that the speaker 13 outputs the sound wave of the signal output from the microphone 14 without inverting its phase or the speaker 13 outputs a sound wave of the signal that has been output from the microphone 14 and has been inverted in the phase inverter 132.

The systems Sj1 and Sj2 include the feedback loops. As described above, the resonance in the sound space 40 shows a more noticeable effect by providing the feedback loop.

There is a distinction between the feedback loop configuration to set the switch 131 so that the speaker 13 outputs the sound wave of the signal output from the microphone 14 without inverting its phase and the feedback loop configuration to set the switch 131 so that the speaker 13 outputs the sound wave of the signal that has been output from the microphone 14 and has been inverted in the phase inverter 132.

In the measurement by the systems Sj1 and Sj2, the sine wave with the specific frequency of 250 Hz continued for 0.1 second is output from the transmitter 111. After a time period of 0.9 second, the sine wave signal continued for 0.1 second is output again. Further, after a time period of 0.9 second, the sine wave continued for 0.1 second is output. That is, the sine wave with 250 Hz continued for 0.1 second is output three times intermittently.

Figure 25:
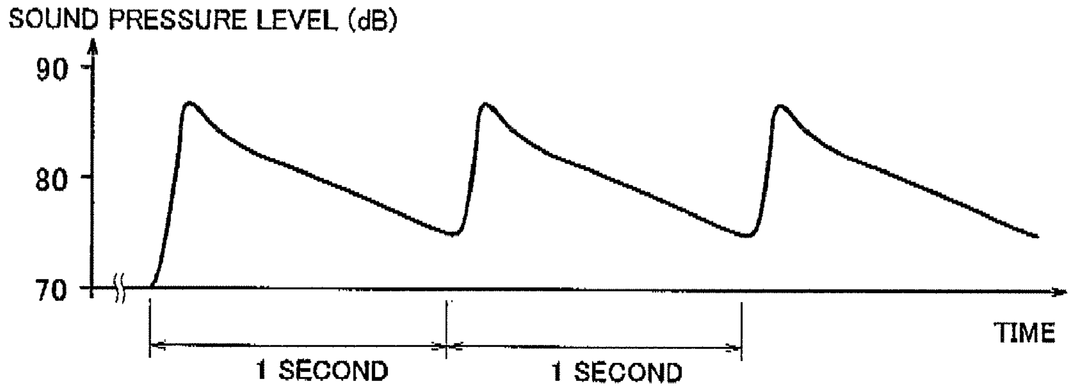
FIG. 25 is a view showing a sound pressure level measured by the microphone on the time axis.

FIG. 25 is a view showing a sound pressure level measured by the microphone 14 on the time axis, when the measurement signal is output from the transmitter 111 in the systems Sj1 and Sj2. In this case, the switch 131 is set so that the speaker 13 outputs the sound wave of the signal output from the microphone 14 without inverting its phase.

As can be seen from FIG. 25, the sound pressure level curve shows three peaks occurring at one second intervals so as to be synchronous with the measurement signal. The sound pressure level attenuates gradually.

As described above, it may be considered that in a case where the sound pressure level attenuates gradually in the sound space, the specific frequency (250 Hz) of the measurement signal is the resonant frequency of the sound space 40. However, there is a possibility that this specific frequency (250 Hz) is not the resonant frequency but the feedback frequency. Even if the specific frequency (250 Hz) is the feedback frequency, the sound level attenuates gradually.

In order to determine the specific frequency (250 Hz) is the resonant frequency or the feedback frequency, similar measurement is conducted while switching the switch 131. The transmitter 111 outputs the sine wave with 250 Hz continued for 0.1 second three times intermittently. In a case where the sound pressure level in the round space 40 is measured to be synchronous with the first output, the switch 131 is set so that the speaker 13 outputs the sound wave of the signal output from the microphone 14 without inverting its phase. In a case where the sound pressure level in the round space 40 is measured to be synchronous with the second output, the switch 131 is set so that the speaker 13 outputs the sound wave of the signal that has been output from the microphone 14 and has been inverted in the phase inverter 132. In a case where the sound pressure level in the round space 40 is measured to be synchronous with the third output, the switch 131 is set so that the speaker 13 outputs a sound wave of the signal output from the microphone 14 without inverting its phase.

The resonant frequency is determined by only the feature of the sound space 40, and therefore, does not change if the structure of the feedback loop changes. When the specific frequency (250 Hz) is the resonant frequency, then the rate with which the sound pressure level of the sound space 40 attenuates does not change if the structure of the feedback loop changes.

However, the feedback frequency changes if the structure of the feedback loop changes. There is a distinction in structure between the feedback loop in which the phase of the signal output from the microphone 14 is not inverted and the feedback loop in which the phase of the signal output from the microphone 14 is inverted. Therefore, if the specific frequency (250 Hz) is the feedback frequency because of the feedback loop in which the phase of the signal output from the microphone 14 is not inverted, the rate with which the sound pressure level in the sound space 40 attenuates changes if the structure of the feedback loop is changed so that the phase of the signal output from the microphone 14 is inverted.

Figure 26:
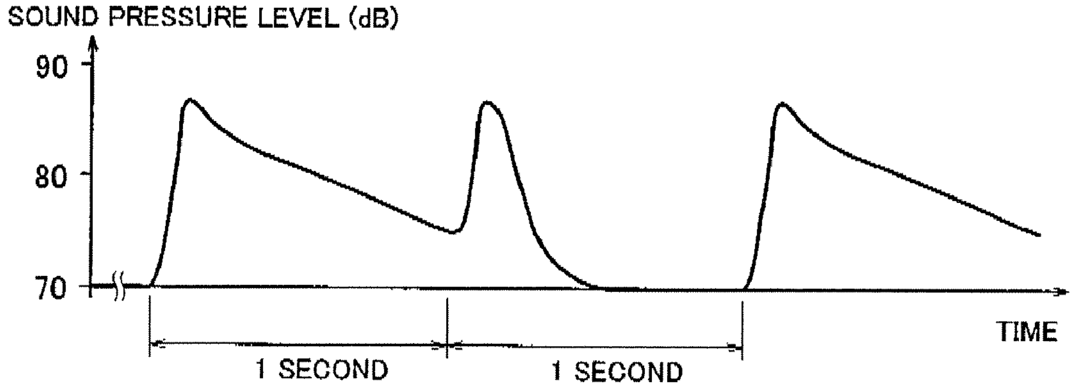
FIG. 26 is a view showing a sound pressure level measured by the microphone on the time axis.

FIG. 26 is a view schematically showing the sound pressure level measured by the microphone 14 on the time axis, when the measurement signal is output from the transmitter 111 while switching the switch 131 in the systems Sj1 and Sj2. To be precise, the sound pressure level curve measured by the system Sj1 of FIG. 24(*a*) and the sound pressure level curve measured by the system Sj2 of FIG. 24(*b*) are not the same but will be explained as the same.

As can be seen from FIG. 26, the sound pressure level curve shows three peaks occurring at one second intervals so as to be synchronous with the measurement signal. The sound pressure level of the sound space 40 attenuates gradually when the sound pressure level is measured to be synchronous with the first output from the transmitter 111. The sound pressure level of the sound space 40 attenuates quickly when the sound pressure level is measured to be synchronous with the second output from the transmitter 111. The sound pressure level of the sound space 40 attenuates gradually when the sound pressure level is measured to be synchronous with the third output from the transmitter 111.

As should be understood, because the rate with which the sound pressure level of the sound space 40 attenuates changes depending on whether the speaker 13 outputs the sound wave of the signal that has been output from the microphone 14 and has been inverted by the inverter 132 or the speaker 13 outputs the sound wave of the signal output from the microphone 14 without inverting its phase, it may be determined that the specific frequency (250 Hz) of the measurement signal is not the resonant frequency.

The resonant frequency in the sound space 40 can be detected so as to be distinguished from the feedback frequency by determining the state of the attenuation process of the sound pressure level of the sound space 40 by the measurement and control unit 115 while gradually changing the specific frequency of the measurement signal.

Thus far, with reference to FIGS. 1 to 26, various apparatuses and methods for detecting the resonant frequency in the sound space 40 have been described.

Subsequently, a method of selecting the frequency to be set as a center frequency in a dip filter 4 (see FIG. 1) among detected resonant frequencies will be described.

Previously, description has been made regarding the fact that the measurement using the system Sa of FIG. 2 and the measurement using the system Sb of FIG. 3 are able to obtain the frequency characteristic of FIG. 4 and the frequency characteristic of FIG. 5, respectively. In addition, description has been made regarding the fact that the frequency f1, the frequency f21, and the frequency f3 which are the frequencies having positive peaks in the characteristic curve Db of FIG. 5 are the resonant frequency or the feedback frequency.

How to select the frequency to be set as the dip center frequency in the dip filter 4 (see FIG. 1) assuming that these frequencies (frequency f1, frequency f21, and frequency f3) are all resonant frequencies for simple explanation will be described.

First, from the frequency f1, the frequency f21, and the frequency f3, predetermined frequencies are selected as candidates for the dip center frequencies to be set in the dip filter 4 as frequencies to be removed.

Specifically, from these frequencies, candidate frequencies are selected in decreasing order of the magnitude of the amplitude levels in the curve Cb of FIG. 4.

Figure 27:
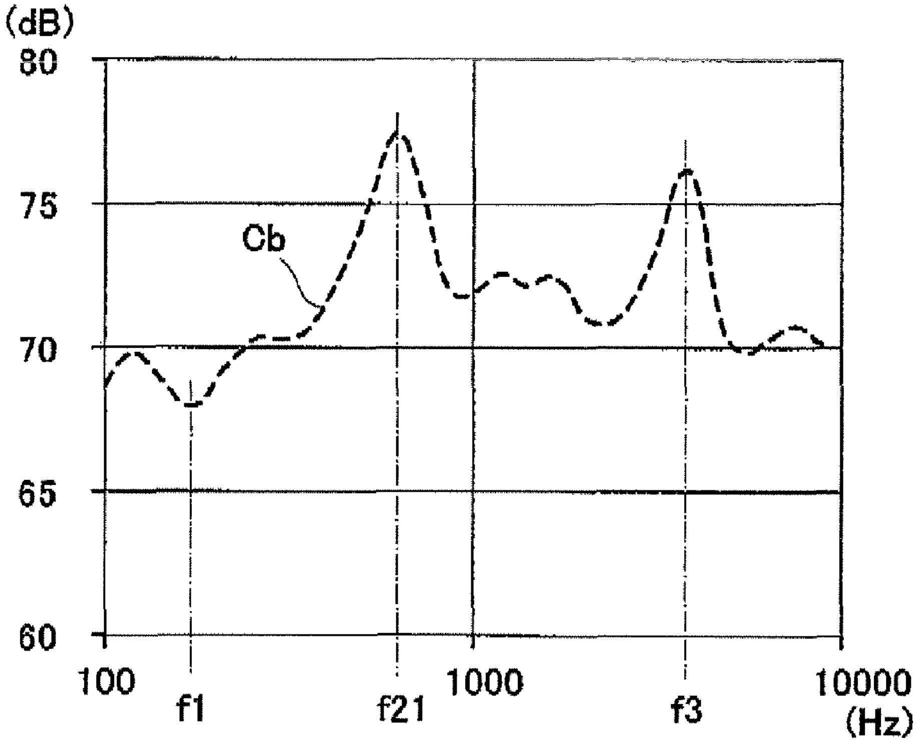
FIG. 27 is a view showing a characteristic obtained by extracting a curve Cb from FIG. 4.

FIG. 27 is a view of a frequency characteristic obtained by extracting only the curve Cb from FIG. 4. In FIG. 27, an ordinate axis and an abscissa axis are logarithmic axes. In FIG. 27, the ordinate axis indicates an amplitude level and an abscissa axis indicates a frequency. In the curve Cb of FIG. 27, the amplitude levels decrease in the order of f21, f3, and f1. If the number of frequencies to be selected as the candidate frequency is "three," then all the frequencies f1, f21, and f3 are candidate frequencies. If the number of frequencies to be selected as the candidate frequency is "two," then the frequencies f21 and f3 are candidate frequencies.

The dip center frequencies to be set in the dip filter 4 may be determined according to a priority based on the magnitude of the amplitude level of the curve Cb of FIG. 27. For example, if the number of the dips to be set in the dip filter 4 is "two," then the frequency f21 and the frequency f3 are set as the dip center frequencies of the dip filter 4. For example, if the number of the dips to be set in the dip filter 4 is "one," the frequency f21 is set as the dip center frequency of the dip filter 4.

The dip center frequencies to be set in the dip filter 4 may be finally determined according to the priority based on the magnitude of the amplitude level of the curve Cb of FIG. 27. Alternatively, candidates of plural dip center frequencies to be set in the dip filter 4 may be selected according to the priority based on the magnitude of the amplitude level of the curve Cb of FIG. 27, and further the candidates (dip center frequency candidates to be set in the dip filter) may be re-ordered based on the magnitude of the amplitude level of the curve Db of FIG. 5.

Here it is assumed that the frequency f1, the frequency f21, and the frequency f3 are all selected as candidate frequencies based on the magnitude of the amplitude level of the curve Cb of FIG. 27. Next, the candidate frequencies (frequency f1, f21, and f3) are re-ordered. They are re-ordered in decreasing order of the magnitude of the amplitude level of the amplitude frequency characteristic curve Db of FIG. 5. The amplitude level of the curve Db of FIG. 5 decrease in the order of the frequency f3, the frequency f21, and the frequency f1. Therefore, the frequency f3 is the first candidate frequency, the frequency f21 is the second candidate frequency, and the frequency f1 is the third candidate frequency.

For example, if the number of the dips to be set in the dip filter 4 is "two," then the frequency f3 and the frequency f21 are set as the dip center frequencies of the dip filter 4. For example, if the number of the dips to be set in the dip filter 4 is "one," then the frequency f3 is set as the dip center frequency of the dip filter 4.

In this manner, the dip center frequencies to be set in the dip filter 4 can be objectively selected without a need for an experience or skills. Thereby, it is possible to effectively inhibit resonance in the sound space 40 of FIG. 1.

The reason why candidates of plural dip center frequencies to be set in the dip filter 4 are selected according to the priority based on the magnitude of the amplitude level of the curve Cb of FIG. 27, and further the candidates (dip center frequency candidates to be set in the dip filter) are re-ordered based on the magnitude of the amplitude level of the curve Db of FIG. 5 is as follows. The curve Cb of FIG. 27 includes the amplitude frequency characteristic of the electroacoustic system (system comprising the amplifier 12, the speaker 13, the microphone 14, etc) as well as the characteristic associated with the resonance in the sound space 40, and depends significantly on the amplitude frequency characteristic of the electroacoustic system as well as the characteristic associated with the resonance in the sound space 40. In contrast, the curve Db of FIG. 5 shows a noticeable effect of the characteristic associated with the resonance in the sound space 40, and the effect of the amplitude frequency characteristic of the electroacoustic system is less. For this reason, it is advantageous to finally determine the dip center frequency to be set in the dip filter 4 based on the magnitude of the amplitude level of the curve Db of FIG. 5, in order to inhibit resonance in the sound space 40.

The above described resonant frequency selecting method is effective when the number of dips to be set in the dip filter or the number of the detected resonant frequencies is larger. For example, when 200 or more resonant frequencies are detected, 120 frequencies may be selected as candidate frequencies in decreasing order of the magnitude of the amplitude level of the curve Cb of FIG. 27, and the remainder may be excluded from the candidate frequencies. Further, 120 candidate frequencies may be re-ordered based on the magnitude of the amplitude level of the curve Db of FIG. 5, and highest 8 frequencies may be set as the dip center frequencies in the dip filter according to the re-order.

Thus far, the embodiments of the present invention have been described with reference to FIGS. 1 to 27.

In the above described embodiments, the method and apparatus for detecting the resonant frequencies of the present invention is applied to detection of the resonant frequency in the sound space in which acoustic equipment is installed, but are applicable to all spaces (sound spaces) which require detection of the resonant frequencies, as well as the above described sound space. For example, the present invention is applicable to a technique for measuring a volume of a space of a liquid tank in which liquid is not filled by detecting the resonant frequency, in order to know the amount of liquid filled inside the tank.

Numerous modifications and alternative embodiments of the invention will be apparent to those skilled in the art in view of the foregoing description. Accordingly, the description is to be construed as illustrative only, and is provided for the purpose of teaching those skilled in the art the best mode of carrying out the invention. The details of the structure and/or function may be varied substantially without departing from the spirit of the invention and all modifications which come within the scope of the appended claims are reserved.

INDUSTRIAL APPLICABILITY

In accordance with the present invention, the resonant frequency can be detected accurately without a need for an experience or skills, and the frequencies to be set as the dip center frequencies in the dip filter can be selected appropriately. For example, the present invention is useful in technical fields of the electroacoustics.

The invention claimed is:

1. A method of detecting a resonant frequency comprising:
- a base step of measuring a base amplitude frequency characteristic;
- a first step of measuring a first amplitude frequency characteristic;
- a second step of measuring a second amplitude frequency characteristic;
- wherein the base amplitude frequency characteristic is an amplitude frequency characteristic obtained by outputting a sound wave of a specified measurement signal from a speaker disposed in a resonant space and by receiving the sound wave in a microphone disposed in the resonant space;
- wherein the first amplitude frequency characteristic is an amplitude frequency characteristic obtained by outputting, from the speaker, a sound wave of the measurement signal and a first delayed signal obtained by delaying a signal output from the microphone by first delay time that is not less than zero, and by receiving the sound wave in the microphone;
- wherein the second amplitude frequency characteristic is an amplitude frequency characteristic obtained by outputting, from the speaker, a sound wave of the measurement signal and a second delayed signal obtained by delaying the signal output from the microphone by second delay time that is not less than zero, and by receiving the sound wave in the microphone;
- wherein the second delay time is different from the first delay time; and
- wherein detecting the resonant frequency in the resonant space is based on the base amplitude frequency characteristic, the first amplitude frequency characteristic, and the second amplitude frequency characteristic.

2. The method of detecting a resonant frequency according to claim 1, wherein the first delay time or the second delay time is zero.

3. The method of detecting a resonant frequency according to claim 1, further comprising:
- detecting, as a first frequency group, a frequency having a peak at which an amplitude of the first amplitude frequency characteristic is larger than an amplitude of the base amplitude frequency characteristic, from a difference between the base amplitude frequency characteristic and the first amplitude frequency characteristic;
- detecting, as a second frequency group, a frequency having a peak at which an amplitude of the second amplitude frequency characteristic is larger than an amplitude of the base amplitude frequency characteristic, from a difference between the base amplitude frequency characteristic and the second amplitude frequency characteristic; and
- detecting, as the resonant frequency, a frequency included in the first frequency group and the second frequency group.

4. The method of detecting a resonant frequency according to claim 1, wherein the measurement signal is a sine wave sweep signal, a noise signal having a component within a predetermined frequency bandwidth and having a center frequency that sweeps, or a pink noise.

5. A method of selecting a resonant frequency comprising:
- detecting a plurality of resonant frequencies by a method of detecting a resonant frequency comprising:
- a base step of measuring a base amplitude frequency characteristic;
- a first step of measuring a first amplitude frequency characteristic;
- a second step of measuring a second amplitude frequency characteristic;
- wherein the base amplitude frequency characteristic is an amplitude frequency characteristic obtained by outputting a sound wave of a specified measurement signal from a speaker disposed in a resonant space and by receiving the sound wave in a microphone disposed in the resonant space;
- wherein the first amplitude frequency characteristic is an amplitude frequency characteristic obtained by outputting, from the speaker, a sound wave of the measurement signal and a first delayed signal obtained by delaying a signal output from the microphone by first delay time that is not less than zero, and by receiving the sound wave in the microphone;
- wherein the second amplitude frequency characteristic is an amplitude frequency characteristic obtained by outputting, from the speaker, a sound wave of the measurement signal and a second delayed signal obtained by delaying the signal output from the microphone by second delay time that is not less than zero, and by receiving the sound wave in the microphone;
- wherein the second delay time is different from the first delay time; and
- wherein detecting the resonant frequency in the resonant space is based on the base amplitude frequency characteristic, the first amplitude frequency characteristic, and the second amplitude frequency characteristic; and
- selecting, from the detected plurality of frequencies, dip center frequencies to be set in a dip filter in decreasing order of magnitude of an amplitude level of the first amplitude frequency characteristic of the second amplitude frequency characteristic.

6. The method of selecting a resonant frequency according to claim 5, further comprising:
- selecting, from the selected dip center frequencies, dip, center frequencies to be set in the dip filter in decreasing order of magnitude of an amplitude level of an amplitude frequency characteristic obtained by subtracting the base amplitude frequency characteristic from the first amplitude frequency characteristic or the second amplitude frequency characteristic.

7. An apparatus for detecting a resonant frequency comprising:
- a sound source means;
- a signal switch means; and
- a measuring means;
- wherein the sound source means is configured to generate a measurement signal;
- wherein the signal switch means is capable of receiving, as inputs, the measurement signal from the sound source means and a signal output from a microphone;
- wherein the signal switch means is capable of switching its state among a base state in which the measurement signal is output to a speaker so as to cause the speaker to output a sound wave, a first state in which the measurement signal and a first delayed signal obtained by delaying the signal output from the microphone by first delay time that is not less than zero are output to the speaker so as to cause the speaker to output a sound wave, and a second state in which the measurement signal and a second delayed signal obtained by delaying the signal output from the microphone by second delay time that is not less than zero are output to the speaker to cause the speaker to output a sound wave;

wherein the second delay time is different from the first delay time;

wherein the measuring means is capable of measuring an amplitude frequency characteristic from the signal output from the microphone; and wherein the measuring means detects the resonant frequency based on comparison between a base amplitude frequency characteristic obtained by measurement with the state of the signal switch means set to the base state and a first amplitude frequency characteristic obtained by measurement with the state of the signal switch means set to the first state, and comparison between the base amplitude frequency characteristic and a second amplitude frequency characteristic obtained by measurement with the state of the signal switch means set to the second state.

8. The apparatus for detecting a resonant frequency according to claim 7, wherein the first delay time or the second delay time is zero.

9. The apparatus for detecting a resonant frequency according to claim 7, wherein the measuring means detects, as a first frequency group, a frequency having a peak at which an amplitude of the first amplitude frequency characteristic is larger than an amplitude of the base amplitude frequency characteristic, from a difference between the base amplitude frequency characteristic and the first amplitude frequency characteristic;

the measuring means detects, as a second frequency group, a frequency having a peak at which an amplitude of the second amplitude frequency characteristic is larger than an amplitude of the base amplitude frequency characteristic, from a difference between the base amplitude frequency characteristic and the second amplitude frequency characteristic; and the measuring means detects, as the resonant frequency, a frequency included in the first frequency group and the second frequency group.

10. The apparatus for detecting a resonant frequency according to claim 7, wherein the measurement signal is a sine wave sweep signal, a noise signal having a component within a predetermined frequency bandwidth and having a center frequency that sweeps, or a pink noise.

11. An apparatus for detecting a resonant frequency comprising:

a sound source means;

a signal output means; and a measuring means;

wherein the sound source means is configured to generate a measurement signal;

wherein the measurement signal is a reference frequency signal repeated plural times intermittently;

wherein the reference frequency signal is a sine wave signal with a specific frequency or a signal having a component within a predetermined frequency bandwidth including the specific frequency at a center thereof;

wherein the signal output means is capable of receiving as inputs the measurement signal from the sound source means and the signal output from the microphone;

wherein the signal output means is capable of outputting, to a speaker, the measurement signal and a delayed signal obtained by delaying the signal output from the microphone by delay time that is not less than zero so as to cause the speaker to output a sound wave;

wherein signal output means changes the delay time to be synchronous with intermittent repeating of the reference frequency signal;

wherein the measuring means is capable of receiving as an input the signal output from the microphone; and wherein the measuring means measures an attenuation property of the signal output from the microphone and detects the resonant frequency based on the attenuation property.

12. The apparatus for detecting a resonant frequency according to claim 11, wherein the measuring means determines whether or not the attenuation property changes according to change in the delay time, and determines that the specific frequency of the reference frequency signal is not the resonant frequency when determining that the attenuation property changes according to the change in the delay time.

* * * * *